(12) United States Patent
Sayama

(10) Patent No.: US 8,177,281 B2
(45) Date of Patent: May 15, 2012

(54) STOWABLE VEHICLE SEAT

(75) Inventor: Tatsuo Sayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 280 days.

(21) Appl. No.: 12/682,084

(22) PCT Filed: Oct. 9, 2008

(86) PCT No.: PCT/JP2008/068389
§ 371 (c)(1),
(2), (4) Date: Apr. 8, 2010

(87) PCT Pub. No.: WO2009/048111
PCT Pub. Date: Apr. 16, 2009

(65) Prior Publication Data
US 2010/0207421 A1 Aug. 19, 2010

(30) Foreign Application Priority Data
Oct. 9, 2007 (JP) ................................. 2007-263230

(51) Int. Cl.
*B60N 2/02* (2006.01)

(52) U.S. Cl. ............... 296/65.05; 296/65.09; 296/65.16; 297/15

(58) Field of Classification Search .................... 296/63, 296/65.01, 65.03, 65.05, 65.06, 65.09, 65.16; 297/14, 15
See application file for complete search history.

(56) References Cited

U.S. PATENT DOCUMENTS

| | | | | |
|---|---|---|---|---|
| 5,570,931 | A * | 11/1996 | Kargilis et al. | .......... 297/378.12 |
| 6,231,101 | B1 | 5/2001 | Kamida et al. | |
| 6,869,138 | B2 * | 3/2005 | Rhodes et al. | .................. 297/15 |
| 2003/0080577 | A1 * | 5/2003 | Roberts et al. | ............. 296/65.09 |
| 2004/0026951 | A1 * | 2/2004 | Rudberg et al. | ............ 296/65.09 |
| 2005/0057081 | A1 * | 3/2005 | Kahn et al. | ..................... 297/331 |
| 2005/0134076 | A1 * | 6/2005 | Storto et al. | ..................... 296/66 |
| 2006/0267366 | A1 * | 11/2006 | Seibold | ....................... 296/65.05 |
| 2007/0075577 | A1 * | 4/2007 | Trombley et al. | ............... 297/335 |
| 2008/0100112 | A1 * | 5/2008 | Hausler et al. | ................. 297/331 |
| 2008/0284196 | A1 * | 11/2008 | Luttinen et al. | ............ 296/65.05 |
| 2009/0189429 | A1 * | 7/2009 | Wilkinson et al. | ....... 297/378.12 |

FOREIGN PATENT DOCUMENTS

| | | |
|---|---|---|
| EP | 1 568 536 A2 | 8/2005 |
| JP | 3299179 B2 | 7/2002 |
| JP | 2005-225376 A | 8/2005 |
| JP | 2005-239050 A | 9/2005 |
| JP | 2006-082698 A | 3/2006 |
| JP | 2006-264454 A | 10/2006 |

* cited by examiner

*Primary Examiner* — Lori Lyjak

(74) *Attorney, Agent, or Firm* — Drinker Biddle & Reath LLP

(57) ABSTRACT

A stowable vehicle seat having improved operability and safety at the time of seat stowage are provided. A seat having a seat cushion back includes a foot lock mechanism for inhibiting the rotating of the cushion, a reclining lock mechanism for inhibiting the rotating of the seat back, a strap pullable toward any pull direction, and a lock releasing mechanism for keeping/releasing the rotate inhibiting states of the foot lock mechanism and the reclining lock mechanism by the pulling operation of the strap. When the pull direction of the strap is a horizontal direction, the lock releasing mechanism releases the rotate inhibiting states of both the foot lock mechanism and the reclining lock mechanism, and when the pull direction of the strap is an upward direction, the lock releasing mechanism keeps the rotate inhibiting states of both the foot lock mechanism and the reclining lock mechanism.

10 Claims, 14 Drawing Sheets

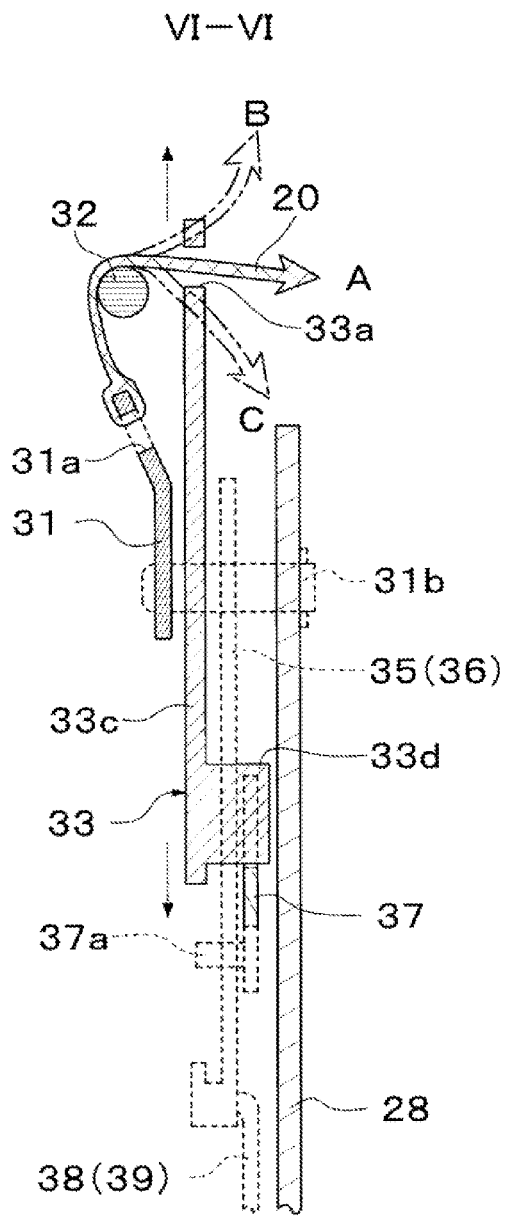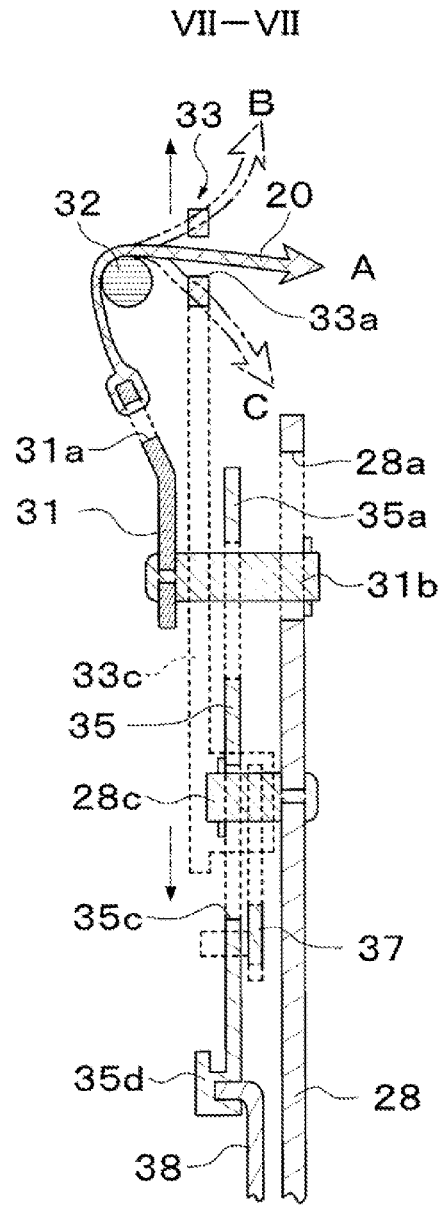

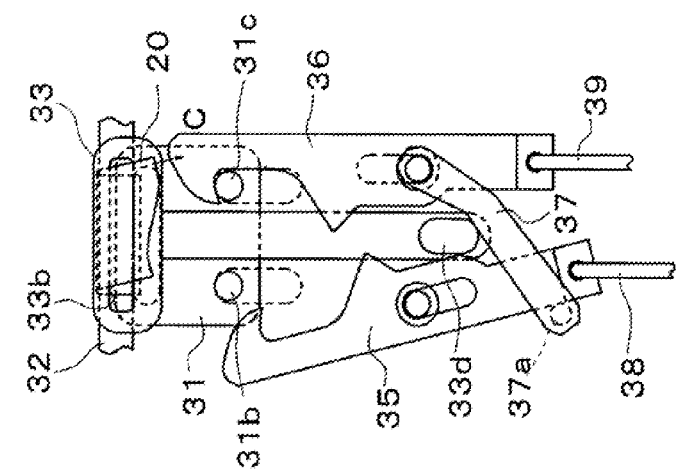
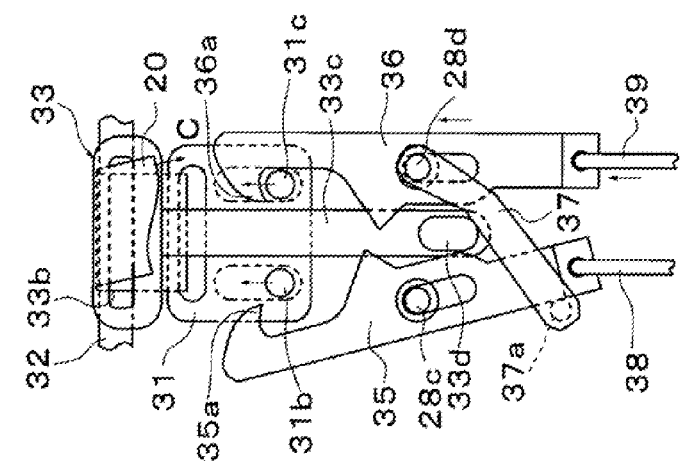
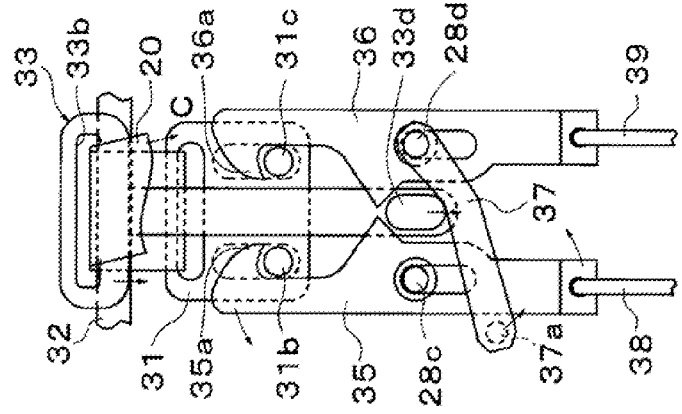

STOWABLE VEHICLE SEAT

CROSS-REFERENCE TO RELATED APPLICATIONS

This application is the U.S. national phase of the International Patent Application No. PCT/JP2008/068389 filed Oct. 9, 2008, which claims the benefit of Japanese Patent Application No. 2007-263230 filed Oct. 9, 2007, the entire content of which is incorporated herein by reference.

BACKGROUND

Various embodiments of the present invention relate to a stowable vehicle seat and, more particularly, to a stowable vehicle seat that is foldable by the rotating of a seat cushion and a seat back.

Conventionally, there has been known a seat in which—in the state in which the rear end part of a seat cushion constituting a vehicle seat is supported to be rotatable in the front and rear direction on the front side of a recess provided in a vehicle body floor, and a seat back is folded over the seat cushion—the vehicle seat can be rotated to the rear and stowed in the recess (for example, refer to Japanese Unexamined Patent Application Publication No. 2006-82698, ("the '698 Publication").

As shown in FIG. 14, a seat 101 described in the '698 Publication includes a seat cushion 111 installed and supported on a vehicle body floor, a seat back 112 held erect on the rear side of the seat cushion 111, a striker lock (not shown) for locking the seat cushion 111 to a striker on the vehicle body floor and supporting the seat cushion 111 on the vehicle body floor, and a reclining lock (not shown) for locking the seat back 112 to hold it in a seating posture. Further, this seat 101 includes a first operating lever 113 operated by a passenger using his/her hand to unlock the striker lock, a pullable strap 114 operated by the passenger, and a second operating lever (not shown) operated by the pulling operation of the strap 114 to unlock a reclining mechanism.

When the seat 101 is folded and stowed in a recess in the vehicle body floor, the second operating lever is operated by pulling the strap 114 to unlock the reclining lock, whereby the seat back 112 is tilted to the seat cushion 111 side. Further, the first operating lever 113 is operated by hand to unlock the striker lock, whereby the seat cushion 111 is rotated to the rear and stowed in the recess in the vehicle body floor.

In this conventional seat, a releasing mechanism (the first operating lever 113) for releasing the striker lock and a releasing mechanism (the strap 114, the second lever) for releasing the reclining lock are divided from each other. Therefore, when the seat 101 is stowed in the recess, two operations of the hand operation of the first operating lever 113 and the pulling operation of the strap 114 are needed, which presents a disadvantage in that the operability is poor, and the stowage of the seat 101 takes much time and effort. Also, since the two independent releasing mechanisms must be provided for the single seat 101, the seat manufacturing cost increases.

In addition, the reclining lock releasing operation using the strap 114 is performed by pulling the strap 114 to the rear side of the seat toward almost the horizontal direction by an operator from the back surface side of the seat 101.

On the other hand, the conventional seat 101 has a construction such that the reclining lock is released even if the strap 114 is pulled upward or downward, not toward the horizontal direction. Therefore, for example, when a passenger (e.g., a child) seated on the seat 101 looks rearward and puts out his/her hand over the seat back 112 to pull the strap 114 upward, although the passenger is in a state of being seated on the seat 101, the reclining lock is released, and the seat back 112 falls on the passenger side.

SUMMARY

An object various embodiments of the present invention is to provide a stowable vehicle seat having improved operability at the time of seat stowage and prevents erroneous operation of a strap to improve safety.

To achieve the above object, various embodiments of the present invention provide a stowable vehicle seat which includes a seat cushion that is rotatable with respect to a vehicle body floor surface and a seat back mounted to the seat cushion to be rotatable with respect to the seat cushion and is foldable by the rotating of the seat cushion and the seat back, wherein the stowable vehicle seat further includes a foot lock mechanism for inhibiting the rotating of the seat cushion; a reclining lock mechanism for inhibiting the rotating of the seat back; a strap that is pullable toward any pull direction; and a lock releasing mechanism for keeping and releasing the rotate inhibiting states of the foot lock mechanism and the reclining lock mechanism via the pulling operation of the strap, the lock releasing mechanism being configured so that in a case where the pull direction of the strap is a first direction within a predetermined angular range, the rotate inhibiting states of both the foot lock mechanism and the reclining lock mechanism are released; and in a case where the pull direction of the strap is a second direction out of the predetermined angular range, the rotate inhibiting states of both the foot lock mechanism and the reclining lock mechanism are kept.

Thus, according to the stowable vehicle seat in accordance with various embodiments of the present invention, in the case where the pull direction of the strap is the first direction, the rotate inhibiting states of both the foot lock mechanism and the reclining lock mechanism are released. Therefore, the stowable vehicle seat can be folded by a simple operation of pulling the strap.

Also, in the case where the pull direction of the strap is the second direction, the rotate inhibiting states of both the foot lock mechanism and the reclining lock mechanism are kept. Therefore, the seat can be made in a foldable state or in a non-foldable state according to the pull direction of the strap.

In this case, it is preferable that the lock releasing mechanism include a foot lock releasing cable which is pulled by the pulling operation of the strap to release the rotate inhibiting state of the seat cushion; a reclining lock releasing cable which is pulled by the pulling operation of the strap to release the rotate inhibiting state of the seat back; a foot lock releasing link which is disposed between the strap and the foot lock releasing cable and can be displaced between a connection position in which the foot lock releasing cable can be pulled by the pulling operation of a strap link and a disconnection position in which the connection is released and the foot lock releasing cable cannot be pulled; a reclining lock releasing link which is disposed between the strap and the reclining lock releasing cable and can be displaced between a connection position in which the reclining lock releasing cable can be pulled by the pulling operation of the strap link and a disconnection position in which the connection is released and the reclining lock releasing cable cannot be pulled; and a select link which is disposed in a position of being contactable with the strap and can be moved coupled with the strap by the contact with the strap, and the select link be configured so that in the case where the pull direction of the strap is the first direction, both the foot lock releasing link and the reclining lock releasing link are kept in the connection position; and in the case where the pull direction of the strap is the second direction, the select link comes into contact with the strap and moves coupled with the strap to displace both the foot lock releasing link and the reclining lock releasing link to the disconnection position.

By this configuration, in the case where the pull direction of the strap is the first direction, the connection states of the foot lock releasing link and the reclining lock releasing link are kept, and both the releasing cables are pulled by the pulling operation of the strap, so that the rotate inhibiting states of both the foot lock mechanism and the reclining lock mechanism are released. Therefore, the stowable vehicle seat can be folded by a simple operation of pulling the strap.

Also, in the case where the pull direction of the strap is the second direction, both the foot lock releasing link and the reclining releasing link are displaced to the disconnection state, and the rotate inhibiting states of the foot lock mechanism and the reclining lock mechanism are kept. Therefore, the seat can be made in a foldable state or in a non-foldable state according to the pull direction of the strap.

In this case, it is preferable that both the foot lock releasing link and the reclining lock releasing link are pivotally supported on a pivotal support to be rotatable with respect to the seat back; and the select link rotate the foot lock releasing link and the reclining lock releasing link to the disconnection position in the case where the pull direction of the strap is the second direction.

By this configuration, in the case where the pull direction of the strap is the second direction, the foot lock releasing link and the reclining lock releasing link are rotated to the disconnection position, and the rotate inhibiting states of both the foot lock releasing link and the reclining lock releasing link are kept, whereby the seat can be made non-foldable. Thus, by the simple configuration of rotating the releasing links, the releasing links can surely be displaced to the disconnection position with certainty. Also, by rotating the releasing links in the reverse direction, the releasing links can easily be restored to the connection position.

In this case, it is preferable that the foot lock releasing link and the reclining lock releasing link each have an elongated hole whose lengthwise direction coincides with the pull direction of the strap, be rotatably supported on a pivot inserted through the elongated hole, and can slide along the lengthwise direction.

Thus, since each of the releasing links has the elongated hole, and is rotatably supported on the pivot inserted through the elongated hole, the releasing link can rotate with respect to the pivot, and can slide along the lengthwise direction of the elongated hole. Therefore, by a simple configuration of providing the elongated hole, the configuration for displacing the releasing link to the disconnection position via rotation and the configuration for pulling the releasing cable by sliding the releasing link toward the pull direction via the strap can be realized.

Also, it is preferable that the select link have a strap insertion hole through which the strap is inserted; and in the case where the pull direction of the strap is the second direction, the strap come into contact with an inner wall face defining the strap insertion hole, and the select link move in the second direction coupled with the strap.

Thus, since the strap insertion hole for inserting the strap through the select link is provided, and the strap is brought into contact with the inner wall face of the strap insertion hole, the select link can be moved coupled with the strap. Therefore, by a simple configuration of providing the insertion hole in the select link, the select link can be moved coupled with the strap with certainty. Also, since the strap is inserted through the strap insertion hole, the strap does not come off the select link, and the select link can be operated with certainty.

Also, it is preferable that the strap have a strap link, on which a pair of projecting strap pins are provided, on the proximal end part side; and the foot lock releasing link and the reclining lock releasing link have engagement claws that engage with the paired strap pins, the strap pin and the engagement claw become in an engaged state in the connection position, and the engaged state of the strap pin and the engagement claw be released in the disconnection position.

Thus, since the releasing link is located in the connection position and the disconnection position by the engagement and disengagement of the releasing link with and from the strap pin, the strap can be connected surely to the releasing cable by engaging the engagement claw of the releasing link with the strap pin with certainty.

Also, it is preferable that the lock releasing mechanism further include a sub link that is disposed in a position of being contactable with the select link and can come into contact with either one of the foot lock releasing link and the reclining lock releasing link; in the case where the pull direction of the strap is a third direction which is opposite to the second direction with the first direction being the reference, the select link move toward the third direction coupled with the strap and come into contact with the sub link; and the sub link come into contact with either one of the foot lock releasing link and the reclining lock releasing link due to the contact with the select link, and displace it to the disconnection state.

By this configuration, when the strap is pulled in the third direction, the select link comes into contact with the sub link, and either one of the foot lock releasing link and the reclining lock releasing link is displaced to the disconnection state. That is to say, when the strap is pulled in the third direction, the rotate inhibiting state of either one of the foot lock mechanism and the reclining lock mechanism is released.

Therefore, the stowable vehicle seat can be arranged in three modes according to the pull direction of the strap, so that by a single operating element of the strap, three seat arrangements can be realized.

In this case, it is preferable that one end side of the sub link be rotatably supported on either one of the foot lock releasing link and the reclining lock releasing link, and the other end side thereof be provided with a projecting sub link pin that presses the side face of the other releasing link; and by the contact of the select link, the side face of the other releasing link be pressed and displaced to the disconnection state.

Thus, one end side of the sub link is pivotally supported on one side of the releasing link, and the projecting link pin for pressing the side face on the other side of the releasing link is provided on the other end side. Therefore, by the rotation of the sub link, the side face of the releasing link on the other side is pressed, so that the releasing link can easily be displaced to the disconnection position.

Also, it is preferable that the projecting select pin be provided with a select link pin; on one side of the select link near the select link pin along the pull direction of the strap, the foot lock releasing link and the reclining lock releasing link be arranged; and on the other side along the pull direction of the strap, the sub link be arranged.

By this arrangement, the select link pin moves in the pull direction of the strap, the foot lock releasing link and the reclining lock releasing link come into contact with each other, and both the releasing links are displaced to the disconnection position. On the other hand, when the select link pin moves to the side opposite to the pull direction of the strap, the select link pin comes into contact with the sub link, and either one of both the releasing links is displaced to the disconnection position. Thus, by arranging the releasing links and the select link in the above-described position by providing the select link pin, three seat arrangements can be realized easily according to the pull direction of the strap.

Also, it is preferable that the select link have a strap insertion hole through which the strap is inserted; in the case where the pull direction of the strap is the second direction, the strap come into contact with the inner wall face on the side along the pull direction of the strap insertion hole, and the select link move in the second direction coupled with the strap; and in the case where the pull direction of the strap is the third direction, the strap come into contact with an inner wall face on the opposite side to the inner wall surface of the strap insertion hole, and the select link move in the third direction coupled with the strap.

Thus, since the strap insertion hole for inserting the strap through the select link is provided, and the strap is brought into contact with the inner wall face of the strap insertion hole, the select link can be moved coupled with the strap. Therefore, by a simple configuration of providing the insertion hole in the select link, the select link can be moved coupled with the strap with certainty. Also, since the strap is inserted through the strap insertion hole, the strap does not come off the select link, and the select link can be operated with certainty.

Further, in the case where the pull direction of the strap is the second direction, the strap comes into contact with the inner wall face of the strap insertion hole, and in the case where the pull direction of the strap is the third direction, the strap comes into contact with an inner wall face on the side opposite to the aforementioned inner wall surface. Therefore, by a simple configuration of providing the strap insertion hole in the select link to insert the strap therethrough, three seat arrangements on account of the strap can be realized easily.

According to the stowable vehicle seat in accordance with various embodiments of the present invention, by pulling the strap in the first direction, the rotate inhibiting states of both the foot lock mechanism and the reclining lock mechanism are released, and the seat can be made in a foldable state. Therefore, unlike the conventional stowable vehicle seat, when the stowable vehicle seat is folded, two operating elements need not be operated, and the stowable vehicle seat can be folded by a simple operation of pulling the strap serving as a single operating element, so that the operability of the seat can be improved.

Also, the seat can be made in a foldable state or in a non-foldable state according to the pull direction of the strap. Therefore, when the seat is not pulled in the normal direction, a non-foldable state is formed, whereby erroneous operation at the time when the seat is folded can be prevented, and the safety of the seat can be improved.

BRIEF DESCRIPTION OF THE DRAWINGS

Embodiments of the invention are illustrated in the following drawings and described in more detail below.

FIGS. 6A, 6B are sectional views of the lock releasing mechanism shown in FIG. 5, taken along the line VI-VI and VII-VII of FIG. 5;

FIGS. 12A-12C are explanatory front views for explaining the operation of a lock releasing mechanism in the reclining mode shown in FIG. 9;

DETAILED DESCRIPTION OF THE EMBODIMENTS

One embodiment of the present invention will now be described with reference to the accompanying drawings. The members, arrangements, and the like described below do not restrict the present invention, and can be modified and changed variously in light of the teachings herein.

A stowable vehicle seat in accordance with one embodiment is explained with reference to FIGS. 1 to 4.

Figure 1:
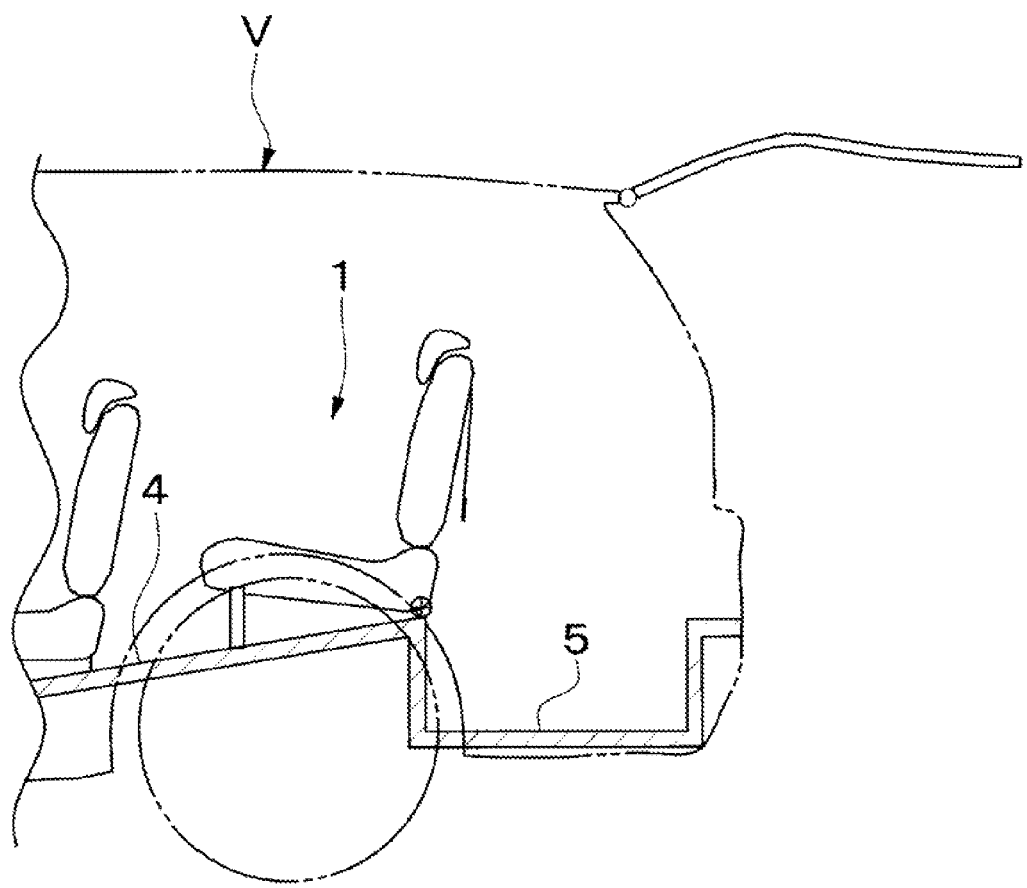
FIG. 1 is a schematic side view of a vehicle rear part equipped with a stowable vehicle seat.

As shown in FIG. 1, a vehicle V of this embodiment is equipped with seats of a plurality of rows (three rows, in this example) arranged in the front and rear direction. Among these seats, a rearmost (third-row, in this example) seat 1 is provided with a stowage recess 5, which is formed in a vehicle body floor 4, at the rear thereof, so that the seat 1 can be stowed in the stowage recess 5. On this vehicle, a floor carpet (not shown) is laid throughout almost the entire surface of the vehicle floor 4.

Figure 2:
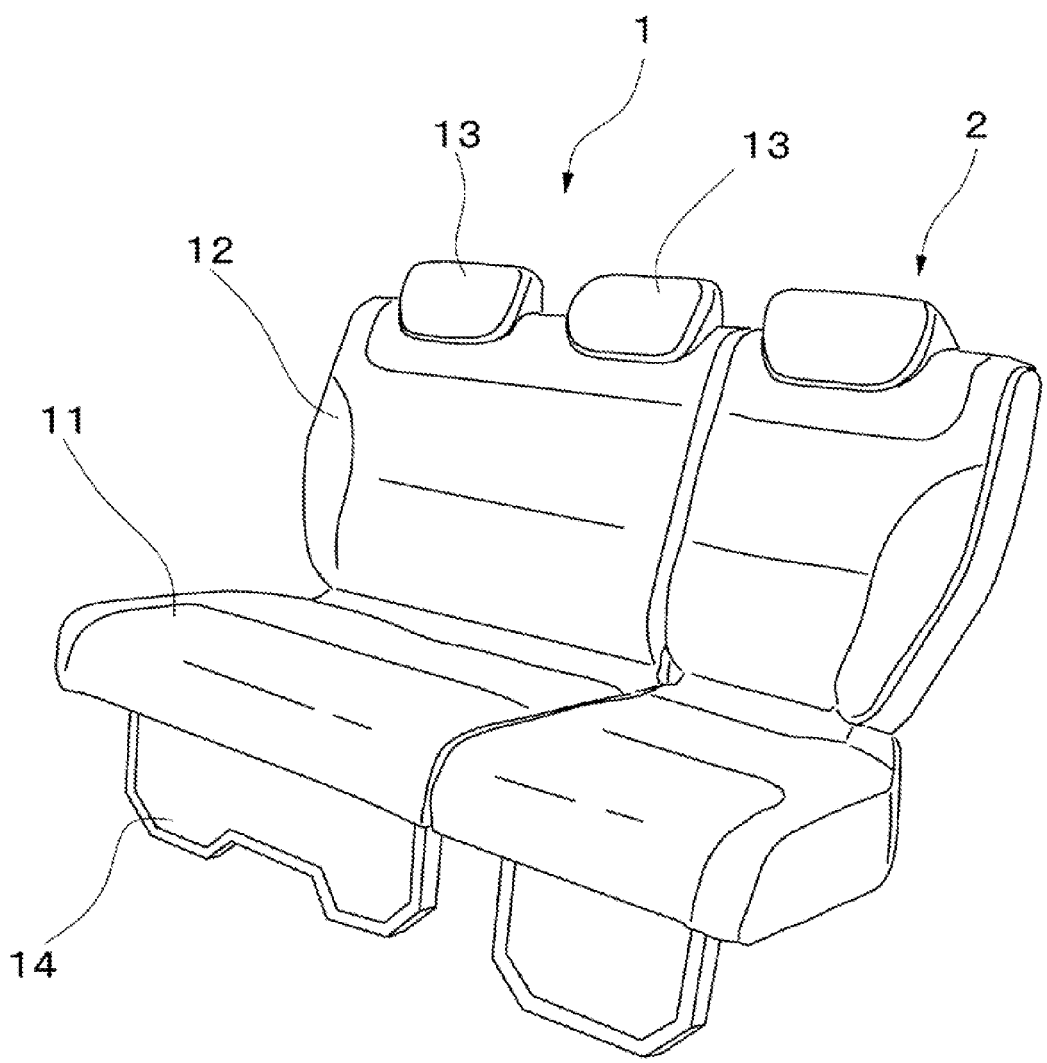
FIG. 2 is a front perspective view of a stowable vehicle seat.

As shown in FIG. 2, the seat of this embodiment has three seats in the right and left direction, and is configured by a seat 1 for two persons, which is located on the right-hand side with respect to the vehicle travel direction, and a seat 2 for one person.

In the description below, the right-hand side and the left-hand side showing the direction are referred to with respect to the vehicle travel direction.

Also, since the stowage mechanisms and operating methods of the right seat 1 and the left seat 2 are the same, in the explanation below, explanation is given of the right seat 1 only, and the explanation of the stowage mechanism and the like of the left seat 2 is omitted.

The seat 1 is made up of a seat cushion 11 provided over the floor surface of a vehicle floor 4, a seat back 12 rotatably supported on the rear side of the seat cushion 11, a pair of right and left headrests 13,13 provided on the upper side of the seat back 12, and a front leg 14 provided on the lower surface on the front side of the seat cushion.

Figure 3:
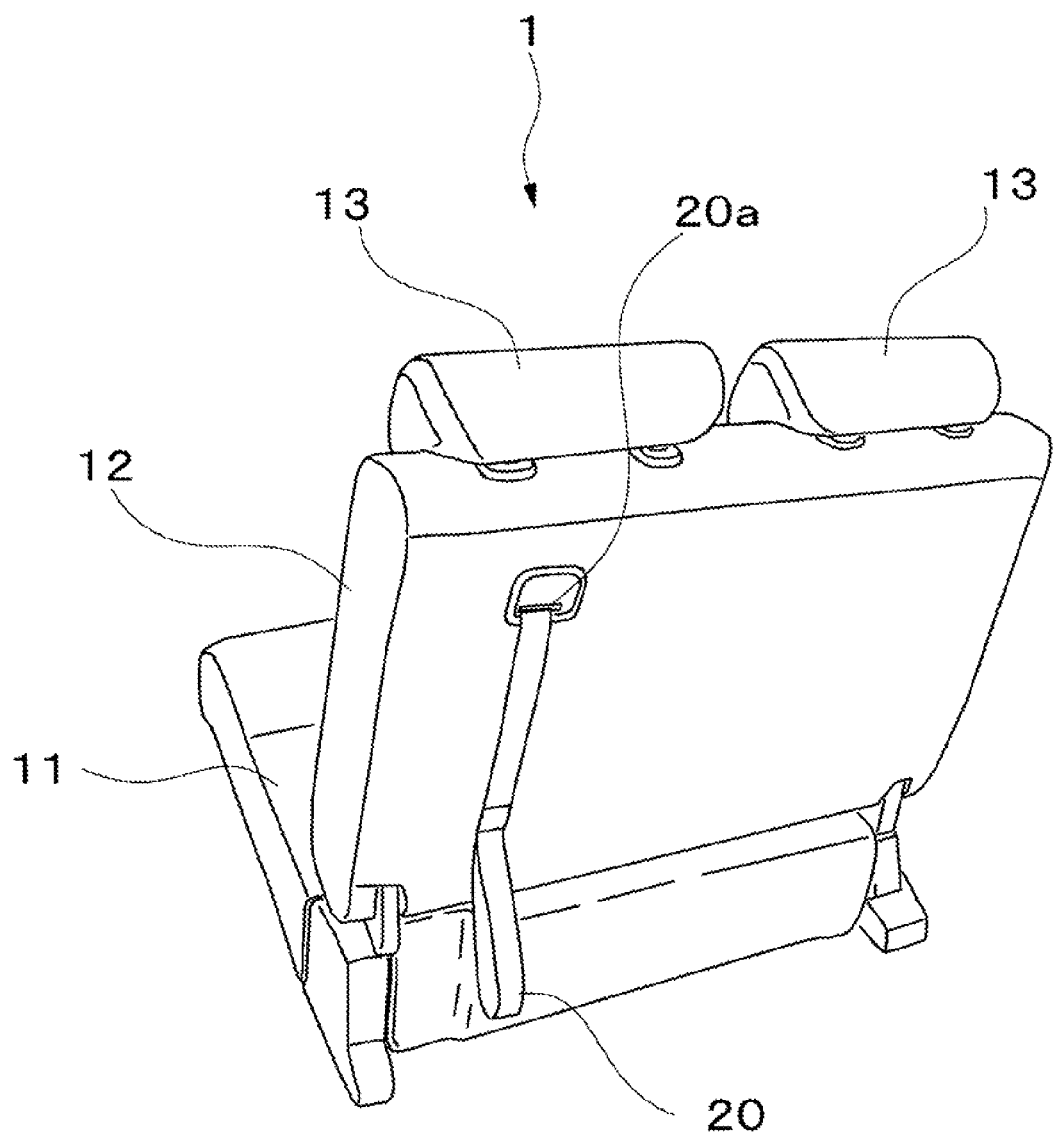
FIG. 3 is a rear perspective view of a stowable vehicle seat.

As shown in FIG. 3, from the back side of the seat back 12, a strap 20 serving as a single operating element for performing the stowing/restoring operation of the seat 1 is extended from the interior of the seat 1.

The strap 20 is an operating element operated at the time of stowing/restoring operation of the seat 1. The strap 20 of this embodiment is a flexible wide and long belt having a length of about 1 m and is extended from the interior of the seat back 12 to the outside through a strap outlet part 20a. On the tip end side of the strap 20 and on the back surface of the seat back 12, planar fasteners are provided so that in the state in which the stowing/restoring operation of the seat 1 is not performed, the strap 20 is attached to the back surface of the seat back 12 by the planar fasteners in a detachable state. In this embodiment, the strap 20, being the operating element, is configured to be of a belt form. However, the strap 20 may be formed in a string form or a pulling lever form.

Figure 4:
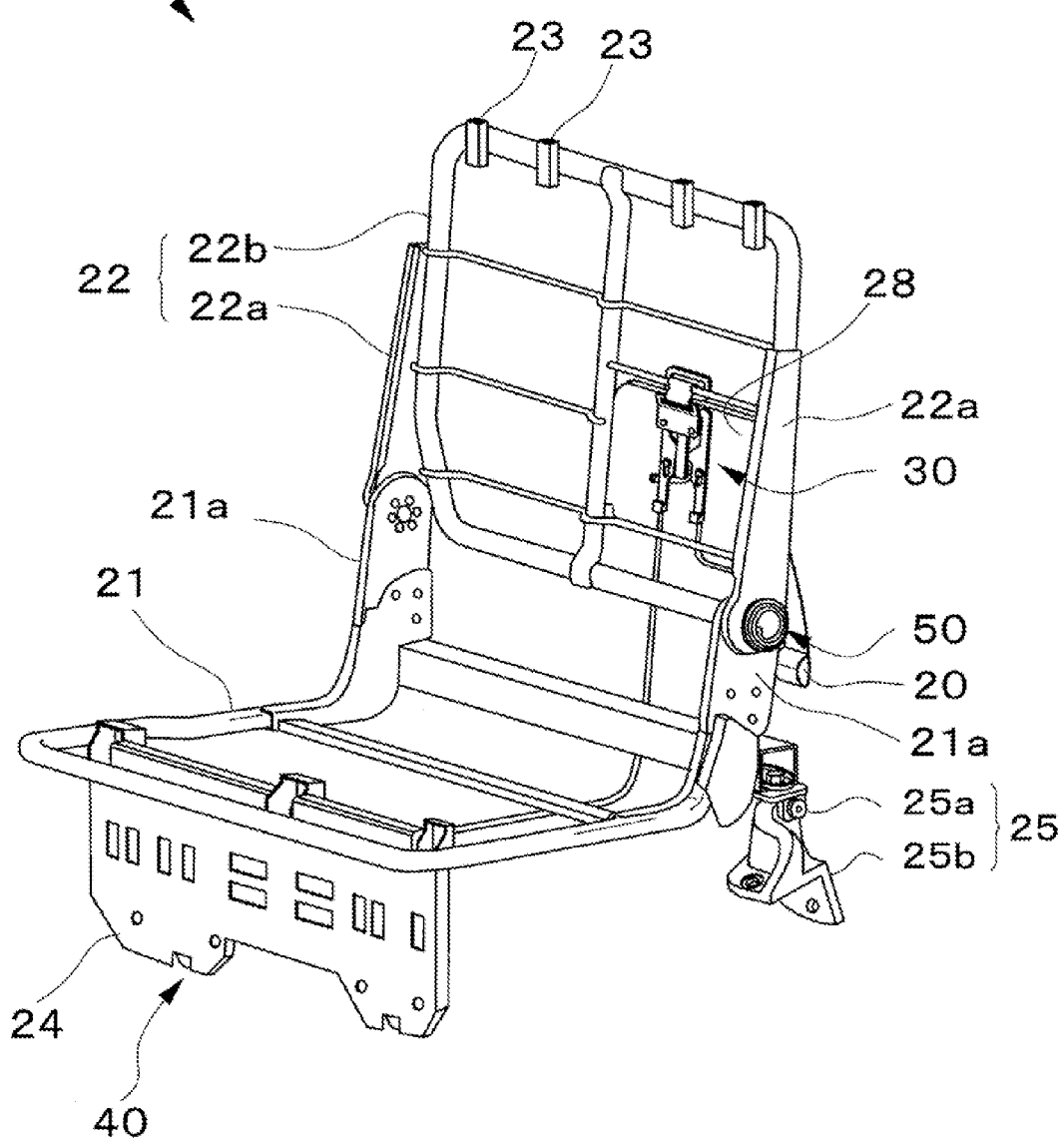
FIG. 4 is a schematic perspective view of a seat frame.

The seat 1 is formed by a seat frame F formed of steel material or the like and a cushion body (not shown) formed of urethane or the like. As shown in FIG. 4, the seat frame F includes a seat cushion frame 21, a seat back frame 22, and a front leg frame 24 provided on the lower side of the seat cushion frame 21, as principal elements. Also, in the upper part of the seat back frame 22, pillar support parts 23 for supporting pillars (not shown) are provided.

The seat cushion frame 21 constitutes the seat cushion 11 that is covered by a cushion pad, a cover, or the like (not shown) and supports the passenger from the lower side. On the lower surface on the front side of the seat cushion frame 21, the front leg frame 24 vertically raised on the vehicle body floor 4 is provided.

Also, on the lower surface on the rear side of the seat cushion frame 21, a pair of right and left seat support parts 25 are provided. The seat support part 25 is formed by a rotating shaft 25a disposed so that the lengthwise direction thereof coincides with the width direction of the seat cushion frame 21 (that is, the right and left direction of vehicle), and a rotating shaft bracket 25b fixed onto the vehicle body floor 4 to support the rotating shaft 25a with a bearing.

To the seat support part 25, a spiral spring (not shown) is mounted to urge the seat cushion 11 to the forward rotating direction and to buffer the shock at the time when the seat 1 is stowed in the stowage recess 5.

Also, in the rear end part of the seat cushion frame 21, a pair of right and left back frame support parts 21a, 21a projecting slantwise upward to the vehicle rear side are provided.

The seat back frame 22 constitutes the seat back 12 that is covered by a cushion pad or the like (not shown) and supports the passenger's back from the rear. The seat back frame 22 of this embodiment comprises a substantially rectangular frame body. More specifically, the seat back frame 22 is formed by two side frames 22a, 22a which are disposed to be separate in the right and left direction and extend in the up and down direction, and a central frame 22b, which is a substantially rectangular frame body held between the side frames 22a, 22a.

The lower end part side of the side frame 22a, 22a is connected to the back frame support part 21a, 21a via a reclining lock mechanism 50.

On the inside of the central frame 22b, a plate-shaped base plate 28 is fixed along the plane for supporting the passenger's back, and on the base plate 28, a lock releasing mechanism 30, described below, is provided.

The front leg frame 24 constitutes the front leg 14 that is covered by a cover material (not shown), and is connected to the vehicle body floor 4 side to support the front side of the seat cushion frame 21. The upper part of the front leg frame 24 is supported on the front side of the seat cushion frame 21 to be rotatable in the front and rear direction, and the lower part of the front leg frame 24 has a foot lock mechanism 40 connected to a striker 49 (refer to FIG. 7) provided on the vehicle body floor 4 side.

Next, the lock releasing mechanism 30 is explained with reference to FIGS. 5 and 6.

The lock releasing mechanism 30 is provided on the plate surface on the front surface (passenger seated surface) of the base plate 28 as described above, and has a function of changing over the releasing and keeping of the locked state of the foot lock mechanism 40 and the rotate inhibiting state (locked state) of the reclining lock mechanism 50 responding to an operating direction of the strap 20 by the passengers.

Figure 5:
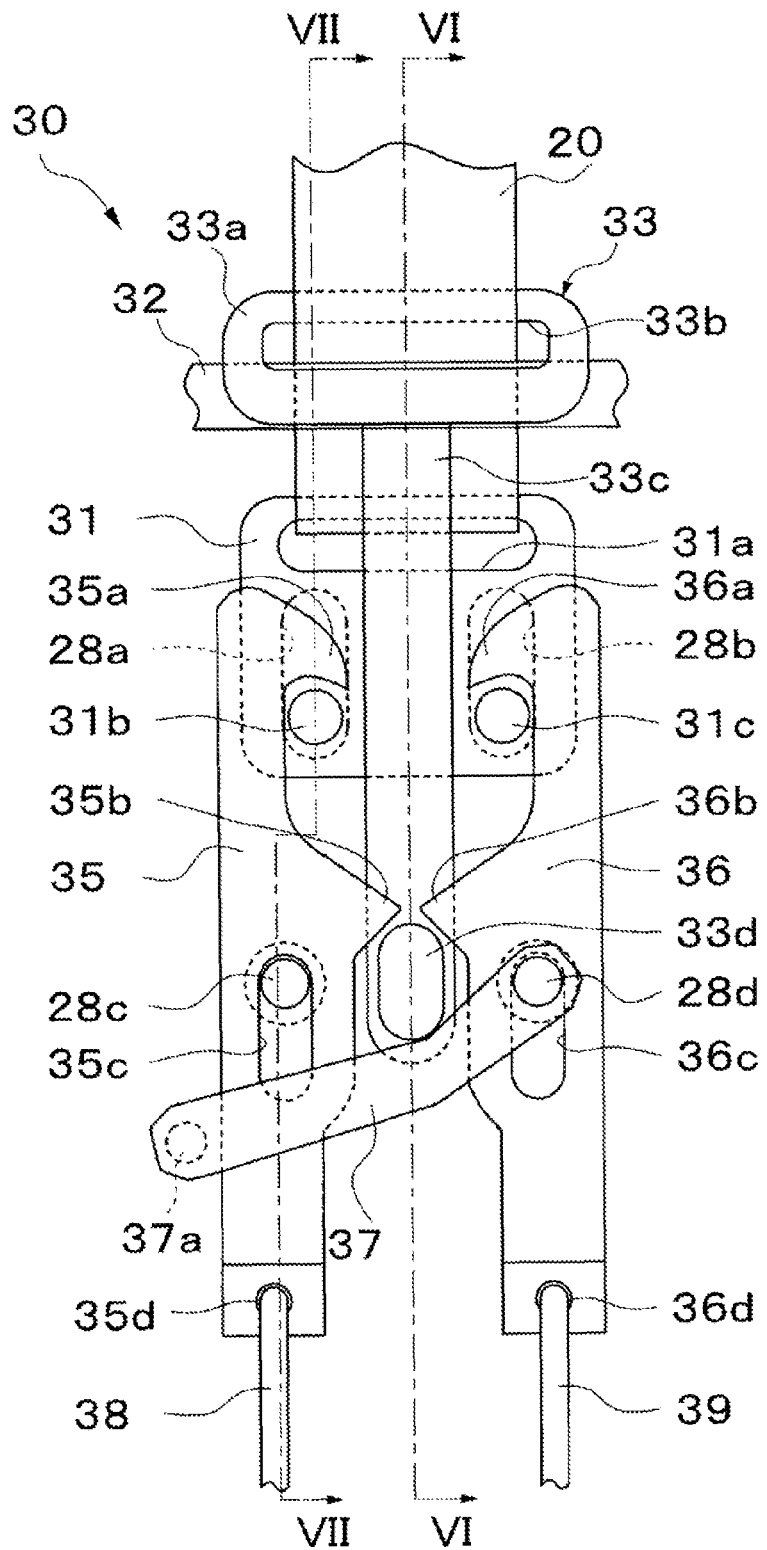
FIG. 5 is an enlarged explanatory front view of a lock releasing mechanism.

In FIG. 5, for convenience of explanation, the body part of the base plate 28 located on the front side of the figure is omitted, strap pin insertion holes 28a and 28b are indicated by dotted lines, and base plate pins 28c and 28d are indicated by solid lines. FIG. 6A is a sectional view of the lock releasing mechanism shown in FIG. 5, taken along the line VI-VI of FIG. 5, and FIG. 6B is a sectional view of the lock releasing mechanism shown in FIG. 5, taken along the line VII-VII of FIG. 5.

As shown in FIGS. 5 and 6B, the base plate 28 is formed with the two elliptical strap pin insertion holes 28a and 28b arranged in parallel along the width direction. Both of the strap pin insertion holes 28a and 28b are arranged so that the lengthwise directions thereof coincide with the up and down direction of the base plate 28.

On the front surface of the base plate 28, the two base plate pins 28c and 28d are provided with an axis perpendicular to the plate surface. The base plate pins 28c and 28d are also provided in parallel along the width direction of the base plate 28. These base plate pins 28c and 28d correspond to the pivots.

As shown in FIG. 5, the lock releasing mechanism 30 includes, as principal elements, a strap link 31, a strap guide wire 32, a select link 33, a foot lock releasing link 35, a reclining lock releasing link 36, a foot lock sub link 37, a foot lock releasing cable 38, and a reclining lock releasing cable 39.

The strap link 31 is a substantially square-shaped member mounted to the proximal end part side (on the end side opposite to the free end part side) of the strap 20. On the upper end side of the strap link 31, a winding hole 31a for winding the proximal end part side of the strap 20 is formed along the width direction, and in a portion close to the lower end in the central portion of the strap link 30, a pair of right and left strap pins 31b and 31c are provided projecting in the direction perpendicular to the plate surface. The strap pins 31b and 31c are inserted through the strap pin insertion holes 28a and 28b, respectively, provided in the base plate 28 to prevent coming off.

The strap guide wire 32, which is a member for regulating the position of the strap 20, is formed by a rod-shaped member in this embodiment. The strap guide wire 32 is disposed above the strap link 31, and is arranged so that the lengthwise direction thereof is substantially in parallel with the width direction of the strap 20. The strap 20 is set in a stretched manner along the upper surface of the strap guide wire 32 from the passenger side so that the strap 20 can be displaced along the pull direction with the strap guide wire 32 being a supporting point.

The select link 33, which is a plate-shaped member disposed on the base plate 28 side (vehicle rear side) of the strap link 31, has an elliptical strap inserting part 33a formed on the upper side, and a rectangular extending part 33c extending from the lower end face of the strap inserting part 33a toward the vertical lower side.

In the central portion of the strap inserting part 33a, a strap insertion hole 33b is penetrating provided. The strap insertion hole 33b is located at almost the same height as the height of the strap guide wire 32, and the strap 20 is inserted through the strap insertion hole 33b. On the lower end side (the distal end side) of the extending part 33c, a cancel link pin 33d is provided having an axis that projects in the direction perpendicular to the plate surface. The cancel link pin 33d corresponds to the select link pin.

As shown in FIGS. 6A and 6B, when the pull direction of the strap 20 is the horizontal direction A (a first direction), the strap 20 does not come into contact with the inner wall face defining the strap insertion hole 33b, or even if coming into contact therewith, the contact force is very small. Therefore, the select link 33 is not displaced, or even if being displaced, the displacement is very small.

On the other hand, when the pull direction of the strap 20 is an upward direction B (a second direction) as compared with the horizontal direction A, the strap 20 comes into contact with the upper side of the inner wall face of the strap insertion hole 33b, so that the select link 33 is displaced upward.

Also, when the pull direction of the strap 20 is a downward direction C (a third direction) as compared with the horizontal direction A, the strap 20 comes into contact with the lower side of the inner wall face of the strap insertion hole 33b, so that the select link 33 is displaced downward.

The foot lock releasing link 35 is a plate-shaped member disposed on the base plate 28 side of the select link 33. The foot lock releasing link 35 is formed by a long member extending along the up and down direction, and on upper end side thereof, a hook-shaped foot lock-side engagement claw 35a projecting to the side is formed. On the side face in the central portion of the foot lock releasing link 35, a projecting piece 35b is provided that projects in the same direction as the projection direction of the foot lock-side engagement claw 35a. Also, in a portion close to the lower end in the central portion of the foot lock releasing link 35, a longitudinally long elliptical base plate pin insertion hole 35c that penetrates the plate surface is formed. Further, on the lower end side of the foot lock releasing link 35, a foot lock cable end 35d for fixing the foot lock releasing cable 38 is provided.

The reclining lock releasing link 36, which is a member having a shape that is mirror image symmetrical with the foot lock releasing link 35, has a hook-shaped reclining lock-side engagement claw 36a projecting to the side, which is formed on the upper end side of the reclining lock releasing link 36, a projecting piece 36b projecting from the side face in the central portion of the reclining lock releasing link 36, a longitudinally long elliptical base plate pin insertion hole 36c formed to penetrate the plate surface, which is formed in the central portion of the reclining lock releasing link 36, and a reclining lock cable end 36d for fixing the reclining lock releasing cable 39, which is provided on the lower end side of the reclining lock releasing link 36. The base plate pin insertion holes 35c and 36c correspond to the elongated holes.

The foot lock releasing link 35 and the reclining lock releasing link 36 are arranged so that the lengthwise directions thereof are in parallel with each other, and they are parallel along the up and down direction. The projecting piece 35b and the projecting piece 36b are in a state in which the side faces in the tip end portions face to each other, and on the lower side thereof, the cancel link pin 33d is provided in a position of being contactable with the projecting pieces 35b and 36b. The foot lock-side engagement claw 35a and the reclining lock-side engagement claw 36a are arranged on the upper side of the strap pins 31b and 31c, respectively. Through the base plate pin insertion hole 35c and the base plate pin insertion hole 36c, the base plate pins 28c and 28d are inserted, respectively.

The foot lock sub link 37 is formed by a substantially L-shaped member that is bent slightly in the central portion thereof. One end side of the foot lock sub link 37 is pivotally mounted to the base plate pin 28d, and the other end side thereof is provided with a foot lock sub link pin 37a projecting perpendicular from the plate surface. The foot lock sub link pin 37a is located near the side face on the outside of the foot lock releasing link 35.

Figure 7:
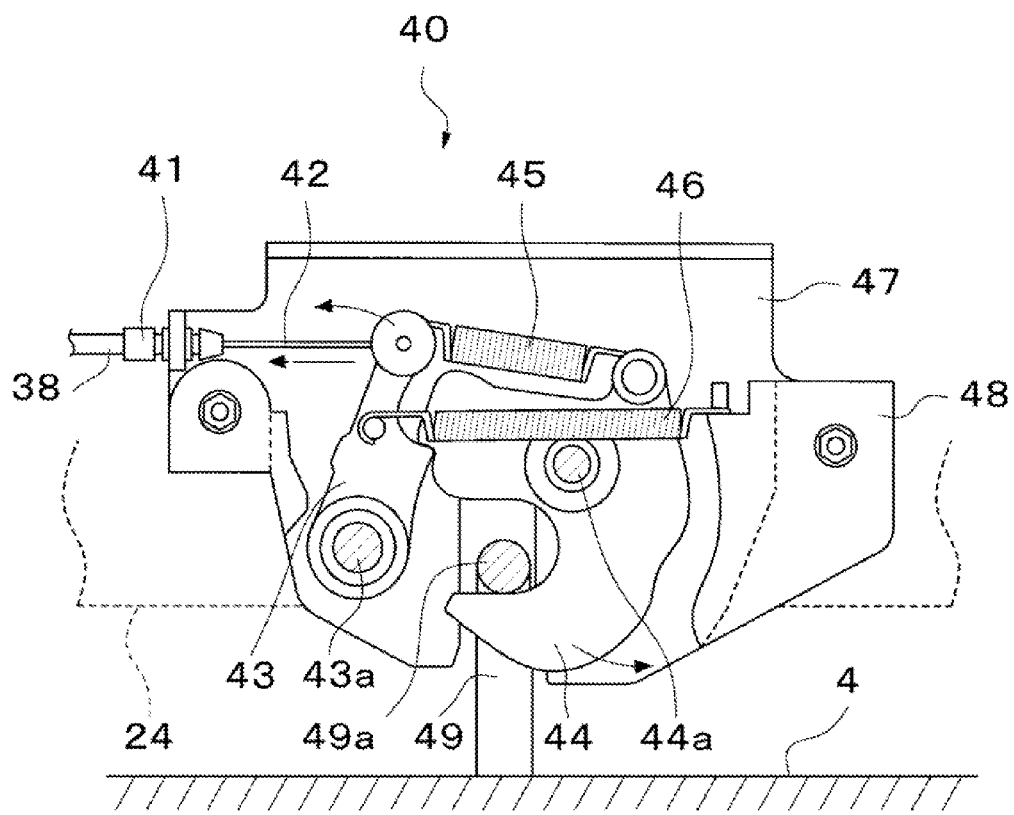
FIG. 7 is an enlarged side view of a foot lock mechanism.

For the foot lock releasing cable 38, one end side thereof is connected to the foot lock cable end 35d of the foot lock releasing link 35, and the other end side thereof is connected to the foot lock mechanism 40 (refer to FIG. 7).

Figure 8:
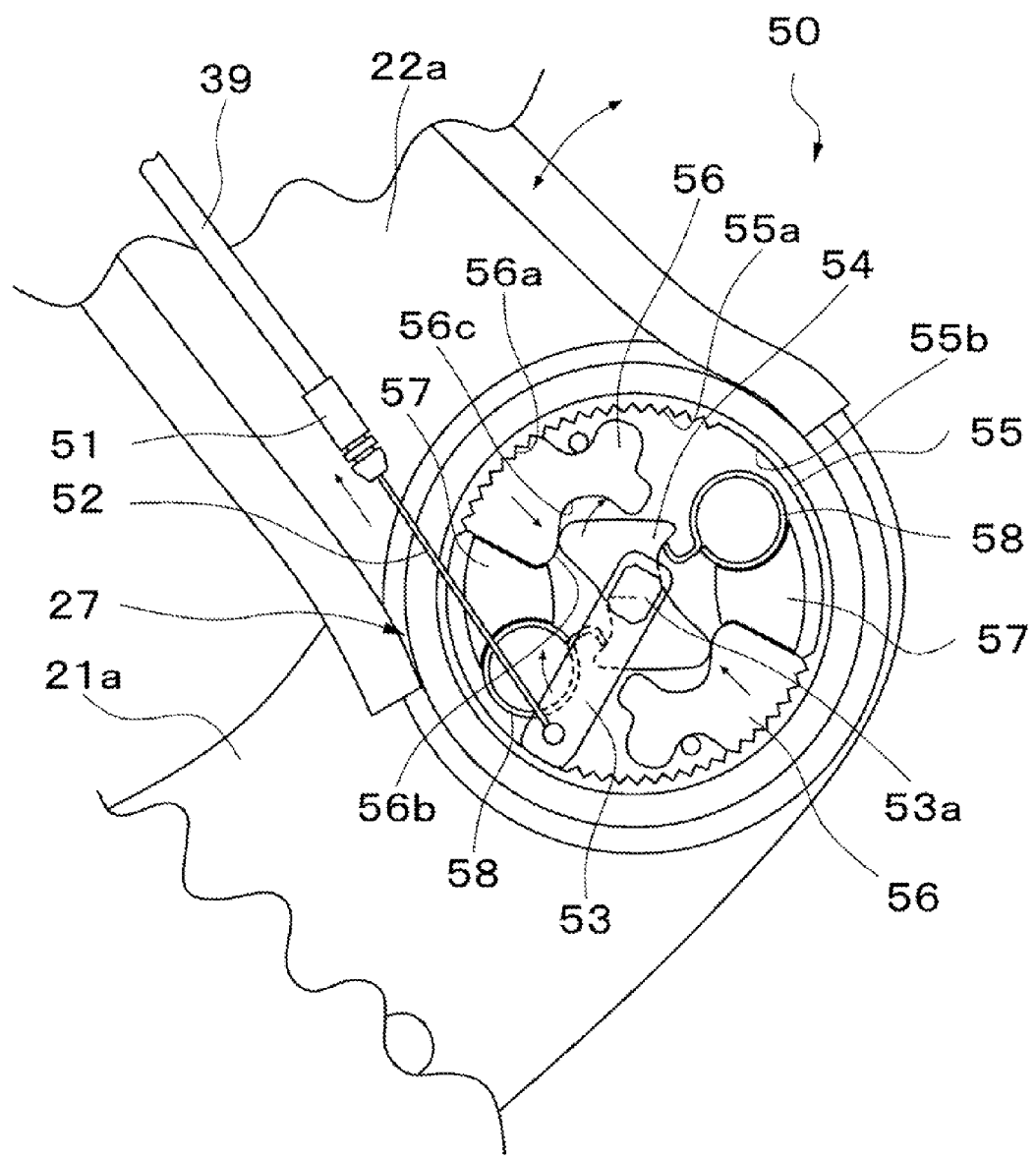
FIG. 8 is an enlarged front view of a reclining lock mechanism.

For the reclining lock releasing cable 39, one end side thereof is connected to the reclining lock cable end 36d of the reclining lock releasing link 36, and the other end side thereof is connected to the reclining lock mechanism 50 (refer to FIG. 8).

Next, the foot lock mechanism 40 is explained. As shown in FIG. 7, the foot lock mechanism 40 includes, as principal elements, an end part member 41, a foot lock releasing wire 42, a cam jaw 43, a lock jaw 44, coil springs 45 and 46, a base frame 47, a cover frame 48, and a striker 49.

The end part member 41 has a proximal end part and a distal end part. To the proximal end part, one end side (the end opposite to the connection end with the foot lock cable end 35d) of the foot lock releasing cable 38 is connected, and to the distal end part, one end side of the foot lock releasing wire 42 is connected. The other end side of the foot lock releasing wire 42 is connected to a disc-shaped mounting plate provided on one end side of the plate-shaped cam jaw 43.

The cam jaw 43 has a projecting edge part projecting to the outside in the central portion thereof, and is pivotally mounted to the plate surface of the base frame 47 by a support shaft 43a provided on the lower end part side to be rotatable around the support shaft 43a.

The lock jaw 44 has a holding mouth for holding a transverse shaft 49a of the striker 49, and a receiving edge part having a shape such as to be engageable with the projecting edge part of the cam jaw 43. The lock jaw 44 is pivotally mounted to the plate surface of the base frame 47 by a support shaft 44a provided in the central portion thereof to be rotatable around the support shaft 44a.

The coil spring 45 is set between the upper side of the cam jaw 43 and the upper side of the lock jaw 44 to urge the lock jaw 44 to the direction such that the holding of the transverse shaft 49a of the striker 49 is released (the arrow-marked direction in the figure).

The coil spring 46 is set between the upper side of the cam jaw 43 and the cover frame 48 to urge the cam jaw 43 in the direction such that the pressed and engaged state of the projecting edge part of the cam jaw 43 and the receiving edge part of the lock jaw 44 is kept.

Next, the operation of the foot lock mechanism 40 is explained.

At the normal time, the projecting edge part of the cam jaw 43 and the receiving edge part of the lock jaw 44 are in an engaged state on account of the urging of the coil spring 46, and a state in which the transverse shaft of the striker 49 is held in and engaged with the holding mouth of the lock jaw 44 is formed. In this state, the rotating of the seat cushion 11 with respect to the vehicle body floor 4 is inhibited, and a locked state is formed.

When the foot lock releasing cable 38 is pulled to the lock releasing mechanism 30 side by the operation of the lock releasing mechanism 30, the foot lock releasing wire 42 is pulled to the same direction, so that the cam jaw 43 connected to the foot lock releasing wire 42 via the coil spring 45 rotates around the support shaft 43a (in the arrow-marked direction in the figure). In association with this rotation, the lock jaw 44 rotates around the support shaft 44a, so that the engaged state of the transverse shaft of the striker 49 with the holding mouth is released. In this state, the locked state of the seat cushion 11 with respect to the vehicle body floor 4 is released, and the seat cushion 11 becomes rotatable.

Next, the reclining lock mechanism 50 is explained. As shown in FIG. 8, the reclining lock mechanism 50 includes, as principal elements, an end part member 51, a reclining lock releasing wire 52, a rotary link 53, a rotation cam 54, a fixed housing 55, lock gears 56, bosses 57, and coil springs 58.

The end part member 51 has a proximal end part and a distal end part. To the proximal end part thereof, one end side (the end opposite to the connection end with the reclining lock cable end 36d) of the reclining lock releasing cable 39 is connected, and to the distal end part, one end side of the reclining lock releasing wire 52 is connected. To the other end side of the reclining lock releasing wire 52, the end part side of the substantially rectangular plate-shaped rotary link 53 is connected.

To the other end side of the rotary link 53, a rotary link rotating shaft 53a having a substantially square-shaped cross section is pivotally mounted. To the rotary link rotating shaft 53a, the substantially S-shaped plate-shaped rotation cam 54 is connected. The rotation cam 54 is disposed in the ring-shaped fixed housing 55 to be rotatable in the fixed housing 55 in association with the turning of the rotary link 53. The center of the fixed housing 55 and the center of the rotary link rotating shaft 53a coincide with each other.

The fixed housing 55 is a ring-shaped member fixed to the lower end side of the side frame 22a of the seat back frame 22. At two places on the inner peripheral surface of the fixed housing 55, gear teeth 55a are formed in an arcuate shape. The regions between the gear teeth 55a at two places serve as sliding contact surfaces 55b on which the gear teeth 55a are not formed.

On the inside of the fixed housing 55, the pair of lock gears 56, 56 and the pair of bosses 57, 57 provided adjacent to the lock gears 56, 56 are disposed. The lock gear 56 has gear teeth 56a in the position facing to the gear teeth 55a. On the side opposite to the gear teeth 56a (the center side of the fixed housing 55) of the lock gear 56, a protrusion 56b projecting gently toward the central portion and a recess 56c depressed gently to the outer periphery direction adjacent to the protrusion 56b are formed. The protrusion 56b and the recess 56c are in the position facing to the vertex part of the S-shaped rotation cam 54.

The boss 57 is a substantially trapezoidal plate-shaped member. The side part on one side thereof has a shape corresponding to the side part of the lock gear 56, and the side part on the other side thereof is formed with an arcuate notch.

The coil spring 58 is configured so that the spring is wound around a shaft, and is accommodated in the arcuate notch of the lock gear 56. The free end of the coil spring 58 is in contact with an S-shaped recess part of the rotation cam 54 substantially at right angles to urge the rotation cam 54 in the counterclockwise direction.

Next, the operation of the reclining lock mechanism 50 is explained.

At the normal time, the rotation cam 54 is urged by the coil spring 58 in the direction such that the vertex part thereof presses the protrusion 56b of the lock gear 56 (the direction opposite to the arrow-marked direction in the figure). In this state, the lock gear 56 is pressed toward the inner peripheral surface side of the fixed housing 55, and a locked state in which the gear teeth are meshed with each other and the rotating of the seat back 12 is blocked.

When the reclining lock releasing cable 39 is pulled to the lock releasing mechanism 30 side by the operation of the lock releasing mechanism 30, the reclining lock releasing wire 52 is pulled to the same direction, so that the rotary link 53 connected to the reclining lock releasing wire 52 rotates around the rotary link rotating shaft 53a. In association with this rotation, the rotation cam 54 rotates, and the vertex part thereof is positioned from the protrusion 56b of the lock gear 56 to the recess 56c thereof. In this position, the lock gears 56 having been pressed against the inner peripheral surface of the fixed housing 55 are displaced toward the central portion, and the meshing of the gear teeth 56a of the lock gears 56 with the gear teeth 55a of the fixed housing 55 is released (in the arrow-marked direction in the figure). Thereby, the seat back 12 is made rotatable in the direction opposite to the seat cushion 11, and therefore can be made in a raised state.

In the position in which the seat back 12 is raised with respect to the seat cushion 11, the gear teeth 56a mesh with the gear teeth 55a in a region separate from the region of meshing with the gear teeth 56a at the fall-down time, so that the seat back 12 is locked in a raised state.

When the reclining lock releasing cable 39 is pulled to the lock releasing mechanism 30 side by the operation of the lock releasing mechanism 30 in this raised state, by the same operation as described above, the meshing of the gear teeth 56a of the lock gear 56 with the gear teeth 55a of the fixed housing 55 is released. Thereby, the seat back 12 is made rotatable in the direction of the seat cushion 11, and therefore can be made in a fall-down state.

Next, the operation for releasing the foot lock mechanism 40 and the reclining lock mechanism 50 according to the pull direction of the strap 20 is explained. In this embodiment, the changeover of the state of the seat 1 in three modes of stowage mode, erroneous operation preventive mode, and reclining mode, according to the pull direction of the strap 20 is explained.

Figure 9A:
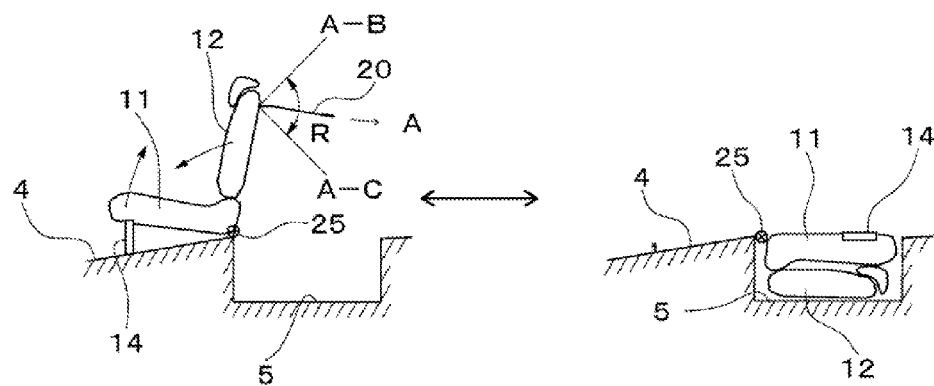
FIGS. 9A-9C are explanatory side views for explaining the operation of stowage mode of a seat depending on the pull direction of a strap.

As shown in FIG. 9A, for the seat 1 of this embodiment, in the case where the pull direction of the strap 20 is the substantially horizontal direction A (the first direction), the locks of both the foot lock mechanism 40 and the reclining lock mechanism 50 are released, and the seat 1 becomes stowable in the stowage recess 5 (stowage mode).

Figure 9B:
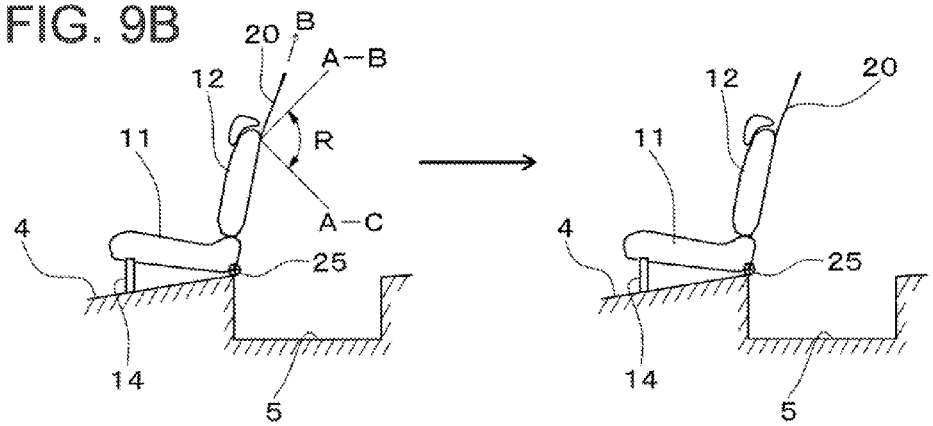

Also, as shown in FIG. 9B, in the case where the pull direction of the strap 20 is the upward direction B (the second direction), the lock of neither the foot lock mechanism 40 nor the reclining lock mechanism 50 is released (erroneous operation preventive mode).

Figure 9C:
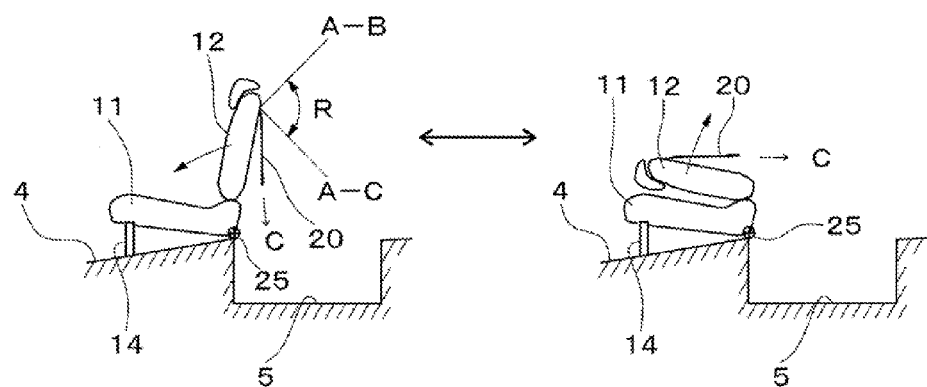

Further, as shown in FIG. 9C, in the case where the pull direction of the strap 20 is the downward direction C (the third direction), the lock of only the reclining lock mechanism 50 is released, and the lock of the foot lock mechanism 40 is not released (reclining mode).

Stowage Mode

First Embodiment

First, the case where the strap 20 is pulled in the horizontal direction A is explained.

Figure 10A:
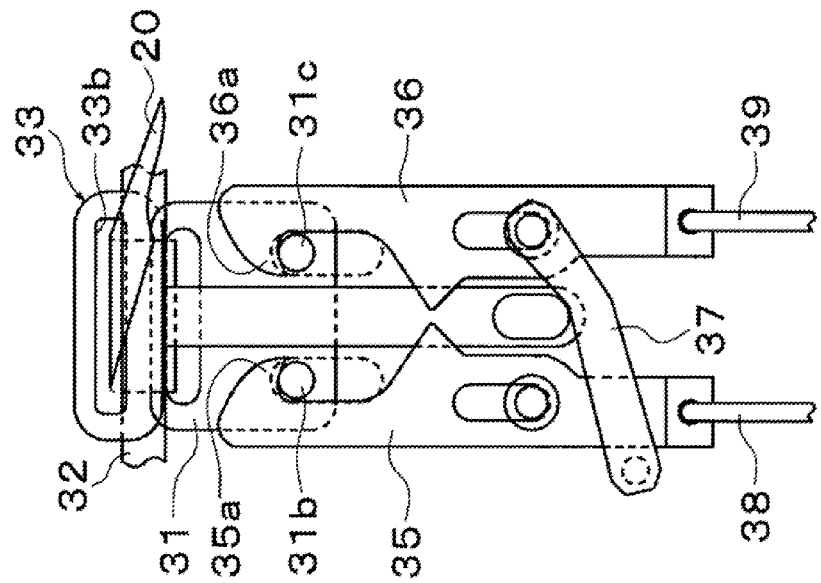
FIGS. 10A, 10B are explanatory front views for explaining the operation of a lock releasing mechanism in the stowage mode shown in FIG. 9.

As shown in FIG. 10A, when the strap 20 is pulled in the horizontal direction A, the strap 20 is pulled out to the outside of the seat 1 through the strap insertion hole 33b in the select link 33 while the direction thereof is regulated by the strap guide wire 32. Thereby, the strap link 31 connected to the proximal end part side of the strap 20 is moved upward. At this time, since the pull direction of the strap 20 is the horizontal direction A, the strap 20 does not come into contact with the inner wall face defining the strap insertion hole 33b, or even if coming into contact therewith, the contact force is very small, so that the select link 33 scarcely move in the up and down direction. Therefore, both the foot lock releasing link 35 and the reclining lock releasing link 36 are kept in the connection position in which these links engage with the strap pins 31b and 31c, respectively.

Figure 10B:
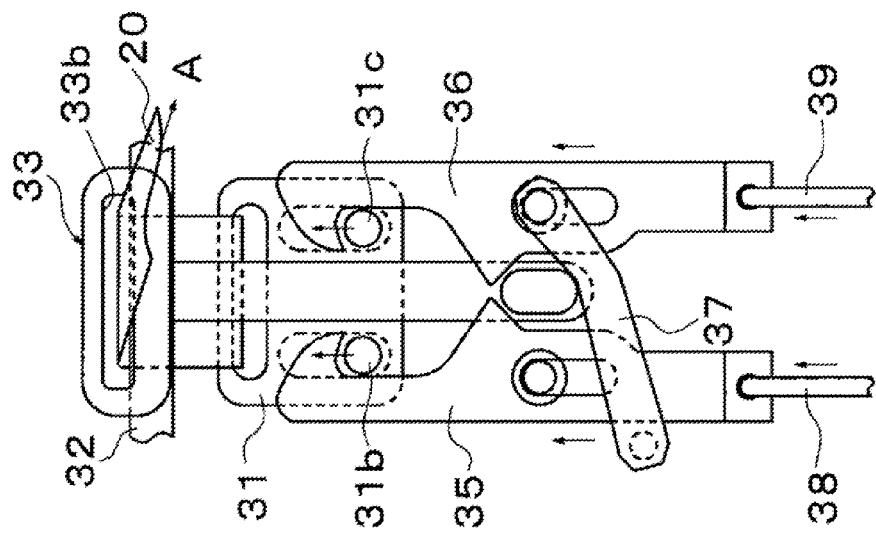

When the strap link 31 is pulled upward and is moved, the strap pins 31b and 31c are also moved upward (in the arrow-marked direction), and the foot lock-side engagement claw 35a and the reclining lock-side engagement claw 36a, which engage with the strap pins, are pushed upward to slide the foot lock releasing link 35 and the reclining lock releasing link 36 upward. Thereby, the foot lock releasing cable 38 and the reclining lock releasing cable 39 are pulled upward, whereby the locks of the foot lock mechanism 40 and the reclining lock mechanism 50 are released (FIG. 10B).

When the locks of both the foot lock mechanism 40 and the reclining lock mechanism 50 are released, the seat cushion 11 becomes rotatable around the seat support part 25, and the seat back 12 becomes movable to the seat cushion 11 direction. Thereby, the seat 1 can be folded and stowed in the stowage recess 5 provided in the vehicle floor 4.

Erroneous Operation Preventive Mode

First Embodiment

Next, the case where the strap 20 is pulled in the upward direction B is explained.

Figure 11A:
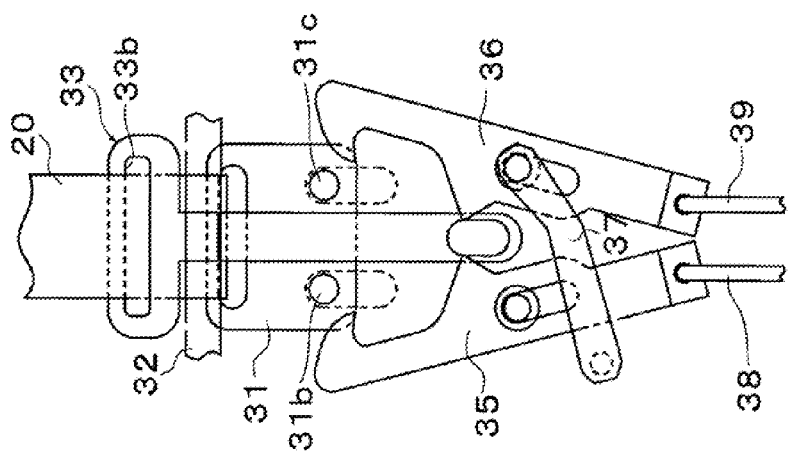
FIGS. 11A-11C are explanatory front views for explaining the operation of a lock releasing mechanism in the erroneous operation preventive mode shown in FIG. 9.

As shown in FIG. 11A, when the strap 20 is pulled toward the upward direction B, the strap 20 is pulled upward with the strap guide wire 32 being a supporting point. Thereby, the strap 20 is brought into contact with the upper inner wall face of the inner wall faces defining the strap insertion hole 33b, so that an upward (that is, pull direction) force is applied to the upper inner wall face, and the select link 33 is raised upward coupled with the strap 20.

When the select link 33 moves upward, the cancel link pin 33d on the lower end side also moves upward coupled with the select link 33, so that the projecting piece 35b of the foot lock releasing link 35 and the projecting piece 36b of the reclining lock releasing link 36 are pushed to the left-hand side and the right-hand side, respectively. Thereby, the foot lock releasing link 35 is rotated to one side (the left direction in the figure) around the base plate pin 28c and is displaced to the disconnection position, and the reclining lock releasing link 36 is rotated to the opposite side (the right direction in the figure) around the base plate pin 28d and is displaced to the disconnection position.

Figure 11B:
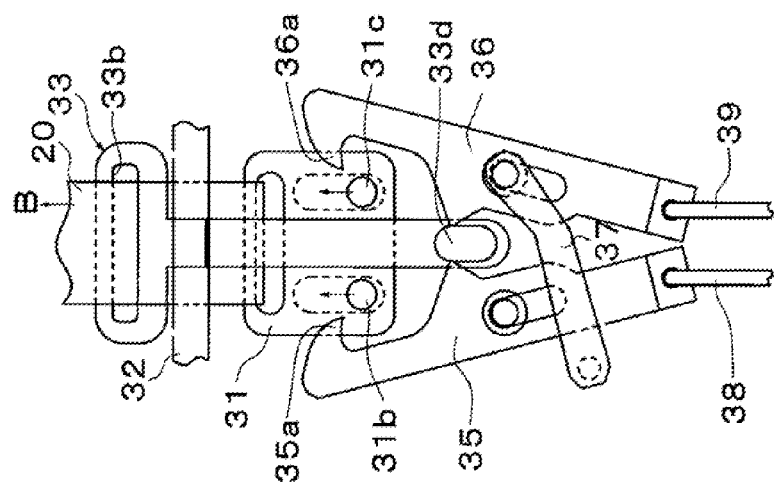
Figure 11C:
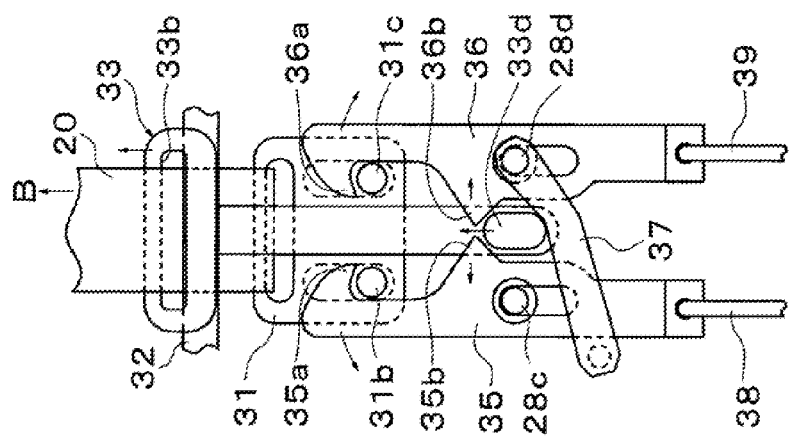

By this rotation, the engagement of the strap pin 31b with the foot lock-side engagement claw 35a and the engagement of the strap pin 31c with the reclining lock-side engagement claw 36a are released (FIG. 11B). When the strap 20 is pulled successively, the strap link 31 is pulled upward and is moved. However, since the engagement of the strap pins 31b and 31c with the foot lock releasing link 35 and the reclining lock releasing link 36 has been released, these links do not slide upward. Therefore, the lock of neither the foot lock mechanism 40 nor the reclining lock mechanism 50 is released (FIG. 11C).

Reclining Mode

First Embodiment

Next, the case where the strap 20 is pulled in the downward direction C is explained.

As shown in FIG. 12A, when the strap 20 is pulled toward the downward direction C, the strap 20 is pulled downward with the strap guide wire 32 being a supporting point. Thereby, the strap 20 is brought into contact with the lower inner wall face of the inner wall faces defining the strap insertion hole 33b, so that a downward (that is, pull direction) force is applied to the lower inner wall face, and the select link 33 is pushed downward coupled with the strap 20.

When the select link 33 moves downward, the cancel link pin 33d on the lower end side also moves downward coupled with the select link 33, so that the foot lock sub link 37 is pushed downward. Thereby, the foot lock sub link 37 is rotated downward around the base plate pin 28d, and the foot lock sub link pin 37a presses the lower side face of the foot lock releasing link 35 inward, so that the foot lock releasing link 35 is rotated around the base plate pin 28c.

By this rotation, the foot lock releasing link 35 is displaced to the disconnection position, and the engagement of the strap pin 31b with the foot lock-side engagement claw 35a is released (FIG. 12B). In this state, the reclining lock-side engagement claw 36a and the strap pin 31c are still engaged with each other and are kept in the connection position.

When the strap 20 is pulled successively, the strap link 31 is pulled upward and is moved, and only the reclining lock releasing link 36 engaging with the strap pin 31c slides upward, so that only the reclining lock releasing cable 39 is pulled upward. Thereby, the lock of the reclining lock mechanism is released (FIG. 12C). On the other hand, since the foot lock releasing link 35 does not slide, the foot lock releasing cable 38 is not pulled upward, so that the lock of the foot lock mechanism 40 is not released.

In this embodiment, the horizontal direction A is not limited to the horizon, and means a direction within the range in which the direction forms a predetermined angle up and down with respect to the horizon. FIG. 9A shows a direction within the range R of angle that the straight line A-B and the straight line A-C make. That is to say, the horizontal direction A means a direction within the angular range in which even if the strap 20 comes into contact with the inner wall face defining the strap insertion hole 33b and moves the select link 33 to the up and down direction, the engagement is not released.

Also, the upward direction B means an upward direction out of the range of the horizontal direction A. FIG. 9B shows a direction having an upward angle larger than the angle that the straight line A-B makes with respect to the horizon.

Also, the downward direction C means a downward direction out of the range of the horizontal direction A. FIG. 9C shows a direction having a downward angle larger than the angle that the straight line A-C makes with respect to the horizon.

According to the stowable vehicle seat 1 in accordance with various embodiments of the present invention, the functions of the operating mechanism that has previously been divided into two operating elements conventionally is integrated into the strap 20. Therefore, the operability at the time of stowing and restoring of the seat 1 can be improved, and also the cost and weight can be reduced. That is to say, the seat 1 can be stowed from the set state by only the pulling operation of the strap 20, and further at the time of restoring operation of the seat 1 as well, the seat back 12 can be raised with respect to the seat cushion 11 by pulling the strap 20. Therefore, high operability can be assured. Also, since the operating mechanism is integrated into the strap 20, the number of parts can be decreased, and therefore the cost and weight can be reduced.

For the stowable vehicle seat 1 in accordance with the present invention, the arrangement of the seat 1 can be changed in three kinds of modes according to the pull direction of the strap 20. Therefore, the operability is improved because intuitive operation of the seat 1 can be performed, and unexpected operation of the seat 1 performed by erroneous operation of the passenger can be prevented.

That is to say, in the case where the strap 20 is pulled in the horizontal direction A, both the foot lock mechanism 40 and the reclining lock mechanism 50 can be released by one operation. Therefore, the stowable vehicle seat 1 in accordance with various embodiments of the present invention does not require time and effort to operate the two operating elements of a lever and a strap, unlike the conventional stowable vehicle seat, and the seat 1 can be folded and stowed by a simple operation.

In the case where the strap 20 is pulled in the upward direction B, the locked states of the foot lock mechanism 40 and the reclining lock mechanism 50 are not released. Therefore, for example, even if a child seated on the seat 1 pulls the strap 20 erroneously over the seat back 12, the locked states of the foot lock mechanism 40 and the reclining lock mechanism 50 are not released, and thereby the seat 1 is not folded. Therefore, for the stowable vehicle seat 1, unexpected operation of the seat 1 performed by erroneous operation of the passenger can be prevented, so that the safety can be improved as compared with the conventional stowable vehicle seat.

Further, by using such an erroneous operation preventive mechanism, safe and reliable seat operation can be performed as compared with the conventional stowable vehicle seat. Therefore, warnings such as the manual description and label indication for calling attention to erroneous operation, which have been carried out conventionally, can be made unnecessary.

In the case where the strap 20 is pulled in the downward direction C, the locked state of only the reclining lock mechanism 50 is released. Therefore, for example, by pulling the strap 20 horizontally to the rear in the state in which the seat back 12 is brought down to the seat cushion 11 side, the reclining lock mechanism 50 can be released, and the seat back 12 can be raised easily. Therefore, for the stowable vehicle seat 1 in accordance with various embodiments of the present invention, the seat back 12 in the fall-down state can be raised by a simple operation as compared with the conventional stowable vehicle seat.

In this embodiment, the third-row vehicle seat divided into the right and left has been explained as a specific example. However, the seat type of the stowable vehicle seat 1 is not limited to this type, and may be a long bench type in which two or more seats are formed integrally. Also, the seat position is not limited to third-row seat, and may be, for example, a passenger seat adjoining the driver's seat, or any other rear seat.

Next, a modification of the above is explained.

In the above-described embodiment (a first embodiment), the releasing links 35 and 36 are fixed to the foot lock releasing cable 38 and the reclining lock releasing cable 39, respectively, and are in an engaged state with the strap link 31. However, the configuration for connecting the strap 20 to the releasing cables 38 and 39 is not limited to the above-described mode, and, for example, the releasing links 35 and 36 may be fixed to the strap 20. In this case, the configuration can be made such that the upper end sides of the releasing cables 38 and 39 are made free ends, and engagement parts that engage with the releasing cables 38 and 39 are provided on the lower end sides of the releasing links 35 and 36 while the upper end sides thereof are fixed directly to the strap 20.

Figure 13:
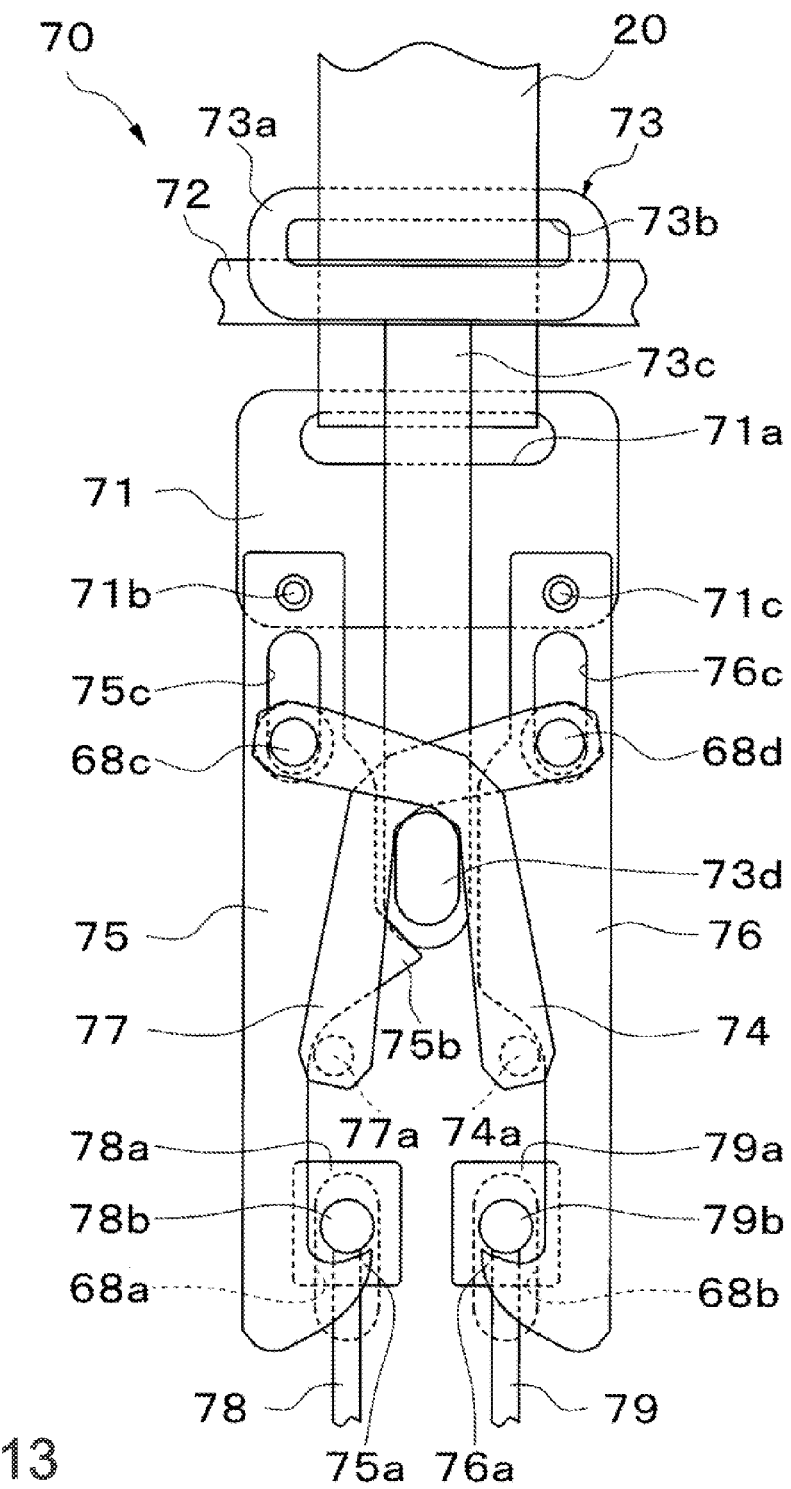
FIG. 13 is an enlarged explanatory front view of a lock releasing mechanism in accordance with a modification.
Figure 14:
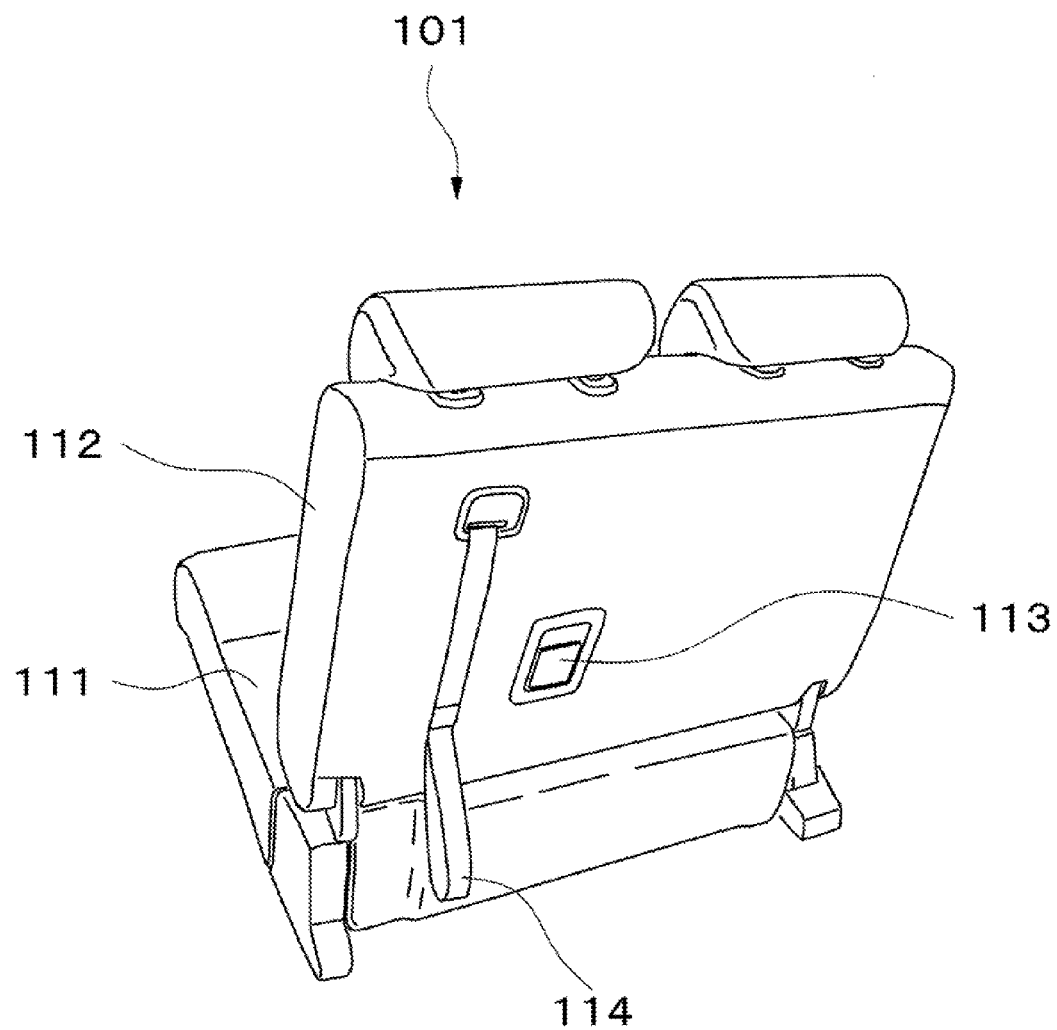
FIG. 14 is a rear perspective view of a conventional stowable vehicle seat.

Hereunder, a lock releasing mechanism in accordance with this modification (a second embodiment) is explained with reference to FIG. 13.

A lock releasing mechanism 70 of this embodiment is fixed to the base plate fixed to the seat back frame like the first embodiment. In FIG. 13, cable pin insertion holes 68a and 68b of the base plate are indicated by dotted lines.

The lock releasing mechanism 70 includes, as principal elements, a strap link 71, a strap guide wire 72, a select link 73, a reclining lock sub link 74, a foot lock releasing link 75, a reclining lock releasing link 76, a foot lock sub link 77, a foot lock releasing cable 78, and a reclining lock releasing cable 79.

The strap link 71 is mounted to the proximal end part side of the strap 20, and is formed with a winding hole 71a as in the first embodiment. On the lower side of the strap link 71, a pair of right and left link mounting parts 71b and 71c are provided.

The strap guide wire 72 is disposed above the strap link 71 and the strap 20 is set in a stretched manner on the strap guide wire 72 as in the first embodiment.

The select link 73 has the same shape as that in the first embodiment, and includes a strap inserting part 73a and an extending part 73c. The strap inserting part 73a is formed with a strap insertion hole 73b, and the extending part 73c is provided in a projecting manner with a cancel link pin 73d.

The foot lock releasing link 75 has a shape similar to that of the foot lock releasing link 35 of the first embodiment, and includes a hook-shaped foot lock-side engagement claw 75a formed on the side face in the lower end part thereof, a projecting piece 75b formed on the side face in the central portion thereof, and a base plate pin insertion hole 75c formed to penetrate the plate surface in the upper end part.

The reclining lock releasing link 76 includes a hook-shaped reclining lock-side engagement claw 76a formed on the side face in the lower end part thereof, and a base plate pin insertion hole 76c formed to penetrate the plate surface in the upper end part thereof.

The upper end sides of the foot lock releasing link 75 and the reclining lock releasing link 76 are rotatably mounted to the link mounting part 71b and the link mounting part 71c of the strap link 71, respectively, by using pins or the like. Through the base plate pin insertion hole 75c and the base plate pin insertion hole 76c, base plate pins 68c and 68d are inserted, respectively. Also, the projecting piece 75b is located below the cancel link pin 73d.

The reclining lock sub link 74 and the foot lock sub link 77 each are formed by a substantially L-shaped member in which the central portion thereof is bent.

One end side of the reclining lock sub link 74 is pivotally mounted to the base plate pin 68c in a rotatable state, and the other end side thereof has a reclining lock sub link pin 74a perpendicularly projecting from the plate surface. One end side of the foot lock sub link 77 is pivotally mounted to the base plate pin 68d in a rotatable state, and the other end side thereof has a foot lock sub link pin 77a perpendicularly projecting from the plate surface.

To one end side of the foot lock releasing cable 78, a foot lock cable plate 78a is connected, and on the plate surface in the central portion of the foot lock cable plate 78a, a foot lock cable pin 78b is provided that projects perpendicular to the plate surface.

To one end side of the reclining lock releasing cable 79, a reclining lock cable plate 79a is connected, and on the plate surface in the central portion of the reclining lock cable plate 79a, a reclining lock cable pin 79b is provided that projects perpendicular to the plate surface.

The foot lock cable pin 78b and the reclining lock cable pin 79b are located on the upper sides of the foot lock-side engagement claw 75a and the reclining lock-side engagement claw 76a, respectively.

By this configuration, as in the first embodiment, the arrangement of the seat 1 can be changed in three kinds of modes (stowage mode, erroneous operation preventive mode, and reclining mode) according to the pull direction of the strap 20.

Stowage Mode

Second Embodiment

In the case where the pull direction of the strap 20 is the horizontal direction A (refer to FIG. 6), the strap 20 does not come into contact with the inner wall face defining the strap insertion hole 73b, or even if coming into contact therewith, the contact force is very small. Therefore, the select link 73 is not displaced, or even if being displaced, the displacement is very small.

Therefore, both the foot lock releasing link 75 and the reclining lock releasing link 76 are kept in the connection position in which these links engage with the foot lock cable pin 78b and the reclining lock cable pin 79b, respectively.

When the strap 20 is pulled in the horizontal direction A in this state, the strap link 71 is pulled upward, and the foot lock releasing link 75 and the reclining lock releasing link 76, which are connected to the strap link 71, slide upward. By this slide, the foot lock releasing cable 78 and the reclining lock releasing cable 79 are pulled upward, and the locks of both the foot lock mechanism 40 and the reclining lock mechanism 50 are released.

Erroneous Operation Preventive Mode

Second Embodiment

In the case where the pull direction of the strap 20 is the upward direction B, the strap 20 comes into contact with the upper side of the inner wall face of the strap insertion hole 73b to displace the select link 73 upward. When the select link 73 is displaced upward, the cancel link pin 73d on the lower end side also moves upward in association with the displacement of the select link 73, and comes into contact with the lower faces of both the reclining lock sub link 74 and the foot lock sub link 77 to push the sub links 74 and 77 upward.

Thereby, the reclining lock sub link 74 and the foot lock sub link 77 are rotated around the base plate pins 68c and 68d, respectively. As the result of this rotating, the reclining lock sub link pin 74a and the foot lock sub link pin 77a press the side faces of the reclining lock releasing link 76 and the foot lock releasing link 75 outward, respectively. Thereby, the releasing links 75 and 76 are displaced to the disconnection position.

Thereby, the engagement of the foot lock cable pin 78b with the foot lock-side engagement claw 75a and the engagement of the reclining lock cable pin 79b with the reclining lock-side engagement claw 76a are released. As the result, even if the strap link 71 moves upward, the foot lock releasing cable 78 and the reclining lock releasing cable 79 are not pulled upward, and the locked states of the foot lock mechanism 40 and the reclining lock mechanism 50 are kept.

Reclining Mode

Second Embodiment

In the case where the pull direction of the strap 20 is the downward direction C, the strap 20 comes into contact with the lower side of the inner wall face of the strap insertion hole 73b to displace the select link 73 downward. When the select link 73 is displaced downward, the cancel link pin 73d on the lower end side also moves downward in association with the displacement of the select link 73, and comes into contact with the projecting piece 75b of the foot lock releasing link 75 to press it to the left-hand side.

Thereby, the foot lock releasing link 75 is rotated to the left direction around the base plate pin 68c, and is displaced to the disconnection position in which the engagement of the foot lock cable pin 78b with the foot lock-side engagement claw 75a is released. When the strap link 71 moves upward in this state, only the reclining lock releasing cable 79 is pulled upward, and the locked state of the reclining lock mechanism 50 is released.

In the above-described first embodiment, the foot lock sub link 37 displaces the reclining lock releasing link 36 to the disconnection state. However, the configuration may be made such that the foot lock sub link 37 displaces the foot lock releasing link 35 to the disconnection state as necessary. In this case, for example, one end side of the sub link 37 is pivotally supported on the base plate pin 28c, and the sub link pin 37a on the other side is arranged in a position of coming into contact with the side part of the reclining lock releasing link 36. By doing this, when the strap 20 is pulled in the downward direction C, the connection state of only the reclining lock releasing link 36 is released, and the locked state of only the foot lock mechanism 40 can be released.

In the second embodiment as well, similarly, by providing the projecting piece 75b, which has been provided on the foot lock releasing link 75, on the reclining lock releasing link 76 only, the locked state of only the foot lock mechanism 40 can be released.

In both of the above-described embodiments, the releasing link is displaced to the disconnection position by being rotated around the base plate pin. However, the configuration for displacing the releasing link is not limited to such a rotation. For example, a transverse groove is formed in the releasing link and a support shaft is inserted therethrough, whereby the releasing link may be displaced to the disconnection position by sliding the releasing link transversely along the groove by way of the pressing of the select link.

| TABLE OF REFERENCE CHARACTERS | |
|---|---|
| V | vehicle |
| F | seat frame |
| 1 | seat (stowable vehicle seat, right seat) |
| 2 | seat (left seat) |
| 4 | vehicle body floor |
| 5 | stowage recess |
| 11 | seat cushion |
| 12 | seat back |
| 13 | headrest |
| 14 | front leg |
| 20 | strap |
| 20a | strap outlet part |
| 21 | seat cushion frame |
| 21a | back frame support part |
| 22 | seat back frame |
| 22a | side frame |
| 22b | central frame |
| 23 | pillar support part |
| 24 | front leg frame |
| 25 | seat support part |
| 25a | rotating shaft |
| 25b | rotating shaft bracket |
| 28 | base plate |
| 28a | strap pin insertion hole |

-continued

TABLE OF REFERENCE CHARACTERS

| | |
|---|---|
| 28b | strap pin insertion hole |
| 28c | base plate pin (pivot) |
| 28d | base plate pin (pivot) |
| 30 | lock releasing mechanism |
| 31 | strap link |
| 31a | winding hole |
| 31b | strap pin |
| 31c | strap pin |
| 32 | strap guide wire |
| 33 | select link |
| 33a | strap inserting part |
| 33b | strap insertion hole |
| 33c | extending part |
| 33d | cancel link pin (select link pin) |
| 35 | foot lock releasing link |
| 35a | foot lock-side engagement claw |
| 35b | projecting piece |
| 35c | base plate pin insertion hole (elongated hole) |
| 35d | foot lock cable end |
| 36 | reclining lock releasing link |
| 36a | reclining lock-side engagement claw |
| 36b | projecting piece |
| 36c | base plate pin insertion hole (elongated hole) |
| 36d | reclining lock cable end |
| 37 | foot lock sub link (sub link) |
| 37a | foot lock sub link pin (sub link pin) |
| 38 | foot lock releasing cable |
| 39 | reclining lock releasing cable |
| 40 | foot lock mechanism |
| 41 | end part member |
| 42 | foot lock releasing wire |
| 43 | cam jaw |
| 43a | support shaft |
| 44 | lock jaw |
| 44a | support shaft |
| 45 | coil spring |
| 46 | coil spring |
| 47 | base frame |
| 48 | cover frame |
| 49 | striker |
| 49a | transverse shaft |
| 50 | reclining lock mechanism |
| 51 | end part member |
| 52 | reclining lock releasing wire |
| 53 | rotary link |
| 53a | rotary link rotation shaft |
| 54 | rotation cam |
| 55 | fixed housing |
| 55a | gear teeth |
| 55b | sliding contact surface |
| 56 | lock gear |
| 56a | gear teeth |
| 56b | protrusion |
| 56c | recess |
| 57 | boss |
| 58 | coil spring |
| 68a | cable pin insertion hole |
| 68b | cable pin insertion hole |
| 68c | base plate pin |
| 68d | base plate pin |
| 70 | lock releasing mechanism |
| 71 | strap link |
| 71a | winding hole |
| 71b | link mounting part |
| 71c | link mounting part |
| 72 | strap guide wire |
| 73 | select link |
| 73a | strap inserting part |
| 73b | strap insertion hole |
| 73c | extending part |
| 73d | cancel link pin |
| 74 | reclining lock sub link |
| 74a | reclining lock sub link pin |
| 75 | foot lock releasing link |
| 75a | foot lock-side engagement claw |
| 75b | projecting piece |
| 75c | base plate pin insertion hole (elongated hole) |
| 76 | reclining lock releasing link |

-continued

TABLE OF REFERENCE CHARACTERS

| | |
|---|---|
| 76a | reclining lock-side engagement claw |
| 76c | base plate pin insertion hole (elongated hole) |
| 77 | foot lock sub link |
| 77a | foot lock sub link pin |
| 78 | foot lock releasing cable |
| 78a | foot lock cable plate |
| 78b | foot lock cable pin |
| 79 | reclining lock releasing cable |
| 79a | reclining lock cable plate |
| 79b | reclining lock cable pin |
| 101 | seat |
| 111 | seat cushion |
| 112 | seat back |
| 113 | operating lever |
| 114 | strap |
| A | horizontal direction (first direction) |
| B | upward direction (second direction) |
| C | downward direction (third direction) |
| R | angular range |

The invention claimed is:

1. A stowable vehicle seat, comprising:
a seat cushion that is rotatable with respect to a vehicle body floor surface and a seat back, mounted to the seat cushion to be rotatable with respect to the seat cushion and is foldable by a rotating of the seat cushion and the seat back:
the stowable vehicle seat further comprising:
a foot lock mechanism for inhibiting the rotating of the seat cushion;
a reclining lock mechanism for inhibiting the rotating of the seat back;
a strap pullable toward any pull direction; and
a lock releasing mechanism for keeping and releasing the rotate inhibiting states of the foot lock mechanism and the reclining lock mechanism via the pulling operation of the strap,
the lock releasing mechanism being configured so that:
in a case where the pull direction of the strap is a first direction within a predetermined angular range, the rotate inhibiting states of both the foot lock mechanism and the reclining lock mechanism are released; and
in a case where the pull direction of the strap is a second direction out of the predetermined angular range, the rotate inhibiting states of both the foot lock mechanism and the reclining lock mechanism are kept.

2. The stowable vehicle seat according to claim 1, wherein the lock releasing mechanism comprises:
a foot lock releasing cable, which is pulled by the pulling operation of the strap to release the rotate inhibiting state of the seat cushion;
a reclining lock releasing cable, which is pulled by the pulling operation of the strap to release the rotate inhibiting state of the seat back;
a foot lock releasing link, which is disposed between the strap and the foot lock releasing cable and can be displaced between a connection position in which the foot lock releasing cable can be pulled by the pulling operation of a strap link and a disconnection position in which the connection is released and the foot lock releasing cable cannot be pulled;
a reclining lock releasing link, which is disposed between the strap and the reclining lock releasing cable and can be displaced between a connection position in which the reclining lock releasing cable can be pulled by the pulling operation of the strap link and a disconnection position in which the connection is released and the reclining lock releasing cable cannot be pulled; and a select link, which is disposed in a position that is contactable with the strap and can be moved coupled with the strap by the contact with the strap, and the select link is configured so that:

in the case where the pull direction of the strap is the first direction, both the foot lock releasing link and the reclining lock releasing link are kept in the connection position; and in the case where the pull direction of the strap is the second direction, the select link comes into contact with the strap and moves coupled with the strap to displace both the foot lock releasing link and the reclining lock releasing link to the disconnection position.

3. The stowable vehicle seat according to claim 2, further comprising:

a pivotal support that pivotally supports both the foot lock releasing link and the reclining lock releasing link to be rotatable with respect to the seat back;

wherein the select link rotates the foot lock releasing link and the reclining lock releasing link to the disconnection position in the case where the pull direction of the strap is the second direction.

4. The stowable vehicle seat according to claim 3, wherein: the foot lock releasing link and the reclining lock releasing link each have an elongated hole whose lengthwise direction coincides with the pull direction of the strap, are rotatably supported on a pivot inserted through the elongated hole, and can slide along the lengthwise direction.

5. The stowable vehicle seat according to claim 2, wherein: the select link has a strap insertion hole through which the strap is inserted; and in the case where the pull direction of the strap is the second direction, the strap comes into contact with an inner wall face defining the strap insertion hole, and the select link moves in the second direction coupled with the strap.

6. The stowable vehicle seat according to claim 2, wherein: the strap has a strap link, on which a pair of projecting strap pins are provided, on a proximal end part side; and the foot lock releasing link and the reclining lock releasing link have engagement claws that are engagable with the paired strap pins, the strap pin and the engagement claw becomes in an engaged state in a connection position, and the engaged state of the strap pin and the engagement claw is released in a disconnection position.

7. The stowable vehicle seat according to claim 2, wherein: the lock releasing mechanism further comprises a sub link which is disposed in a position that is contactable with the select link and can come into contact with either one of the foot lock releasing link and the reclining lock releasing link;

in a case where the pull direction of the strap is a third direction which is opposite to the second direction with the first direction being the reference, the select link moves toward the third direction coupled with the strap and comes into contact with the sub link; and the sub link comes into contact with either one of the foot lock releasing link and the reclining lock releasing link due to the contact with the select link, and displaces it to the disconnection state.

8. The stowable vehicle seat according to claim 7, wherein: one end side of the sub link is pivotally supported on either one of the foot lock releasing link and the reclining lock releasing link, and an other end side thereof is provided with a projecting sub link pin that presses the side face of the other releasing link; and by the contact of the select link, the side face of the other releasing link is pressed and displaced to the disconnection state.

9. The stowable vehicle seat according to claim 7, wherein: the projecting select pin is provided with a select link pin;

on one side of the select link near the select link pin along the pull direction of the strap, the foot lock releasing link and the reclining lock releasing link are arranged; and on the other side along the pull direction of the strap, the sub link is arranged.

10. The stowable vehicle seat according to claim 7, wherein:

the select link has a strap insertion hole through which the strap is inserted;

in the case where the pull direction of the strap is the second direction, the strap comes into contact with the inner wall face on the side along the pull direction of the strap insertion hole, and the select link moves in the second direction coupled with the strap; and in the case where the pull direction of the strap is the third direction, the strap comes into contact with an inner wall face on the opposite side to the inner wall surface of the strap insertion hole, and the select link moves in the third direction coupled with the strap.

\* \* \* \* \*